US012300997B2

(12) United States Patent
Gopalakrishnan et al.

(10) Patent No.: US 12,300,997 B2
(45) Date of Patent: May 13, 2025

(54) SYSTEMS AND METHODS FOR DETERMINING A SITE CONTROL ARCHITECTURE FOR CONTROLLING INVERTERS IN MICROGRID-BASED SITE

(71) Applicant: BLOOM ENERGY CORPORATION, San Jose, CA (US)

(72) Inventors: Vishal Anand Aisur Gopalakrishnan, San Jose, CA (US); Ranganathan Gurunathan, San Jose, CA (US); Prasad Pmsvvsv, San Jose, CA (US); Chaitanya Mandela, San Jose, CA (US); Saravanakumar Narayanasamy, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/406,874

(22) Filed: Jan. 8, 2024

(65) Prior Publication Data

US 2024/0243607 A1 Jul. 18, 2024

(30) Foreign Application Priority Data

Jan. 12, 2023 (IN) .............................. 202341002559

(51) Int. Cl.
H02J 13/00 (2006.01)
(52) U.S. Cl.
CPC .................................... H02J 13/00 (2013.01)
(58) Field of Classification Search
CPC ..................................................... H02J 13/00
See application file for complete search history.

(56) References Cited

U.S. PATENT DOCUMENTS 10,459,473 B2 10/2019 Miller et al.
2017/0147025 A1 5/2017 Darden, II et al.
2019/0326755 A1* 10/2019 Fu ..................... H02J 13/00002

OTHER PUBLICATIONS

Advanced Control Architectures for Intelligent MicroGrids, Part I, Guerrero, Josep M.; Chandorkar, Mukul; Lee, Tzung-Lin; Loh, Poh Chiang, 2013, pp. 1-10, Aalborg University, Denmark.

* cited by examiner

*Primary Examiner* — Charles R Kasenge
(74) *Attorney, Agent, or Firm* — Evergreen Valley Law Group; Kanika Radhakrishnan

(57) ABSTRACT

Systems and methods for determining a site control architecture for controlling inverter(s) in a microgrid-based site are disclosed. The system includes a site controller, stamp controller(s), and inverter controller(s) communicatively coupled with each other. The site controller receives site operating input(s) associated with a microgrid-based site, determines a site control architecture for implementation on the microgrid-based site to stabilize an operation of the microgrid-based site, receives values corresponding to electrical parameter(s) associated with electrical point(s) in the microgrid-based site, transmits a control message to each of the stamp controller(s) and the inverter controller(s), and facilitates each of the stamp controller(s) and the inverter controller(s) to operate in one of at least two control modes for implementing the determined site control architecture, in response to the control message. The at least two control modes include an Alternating Current (AC) droop control mode and a master-slave control mode.

10 Claims, 10 Drawing Sheets

SYSTEMS AND METHODS FOR DETERMINING A SITE CONTROL ARCHITECTURE FOR CONTROLLING INVERTERS IN MICROGRID-BASED SITE

TECHNICAL FIELD

The present invention relates to the field of distributed power generation and, more particularly, to systems and methods for determining a site control architecture for controlling one or more inverters in a microgrid-based site.

BACKGROUND

Over the past few years, microgrids using renewable energy sources have been in demand. A microgrid can include a local low-voltage power system that offers advantages over a main power grid in terms of security, power autonomy, and the ability to incorporate distributed renewable energy generation sources. A microgrid can include one or more controllers that manage the operation of various components of the microgrid. Further, a microgrid can be a grid-connected microgrid or an islanded microgrid based on the presence of a grid. A microgrid can also be a Direct Current (DC) microgrid or an Alternating Current (AC) microgrid based on its operational status. In AC microgrids, inverters can be used to perform DC-to-AC conversion. If a microgrid or an electrical network of microgrids has a large number of energy sources, they might usually be associated with a large number of inverters. Controlling the operation of a large number of inverters is one of the challenges faced in microgrid operations.

Typically, two types of two types of control strategies, such as master-slave control strategy and AC droop control strategy are employed to control paralleled inverters in Microgrids. However, both these control strategies have their own set of challenges and merits when employed independently. There is a technological need for an improved system and method that intelligently determines the site control architecture based on site-specific requirements to get the best out of both the control strategies.

SUMMARY

Various embodiments of the present disclosure provide systems and methods for determining a site control architecture for controlling one or more inverters in a microgrid-based site.

In an embodiment, a system is disclosed that includes a site controller. The system also includes one or more stamp controllers communicatively coupled to the site controller. The system further includes one or more inverter controllers communicatively coupled to at least one of the site controller and the one or more stamp controllers. The site controller is configured to receive one or more site operating inputs associated with a microgrid-based site. The microgrid-based site includes an electrical network of one or more microgrids. The site controller is further configured to determine a site control architecture for implementation on the microgrid-based site to stabilize an operation of the microgrid-based site based, at least in part, on the one or more site operating inputs. Further, the site controller is configured to receive values corresponding to one or more electrical parameters associated with one or more electrical points in the microgrid-based site. The site controller is further configured to transmit a control message to each of the one or more stamp controllers and the one or more inverter controllers. The control message includes the values corresponding to the one or more electrical parameters and information commanding the one or more stamp controllers and the one or more inverter controllers to implement the determined site control architecture. Furthermore, the site controller is configured to facilitate each of the one or more stamp controllers and the one or more inverter controllers to operate in one of at least two control modes for implementing the determined site control architecture, in response to the control message. The at least two control modes include an Alternating Current (AC) droop control mode and a master-slave control mode.

In another embodiment, a method for determining a site control architecture for controlling one or more inverters in a microgrid-based site is disclosed. The method includes receiving one or more site operating inputs associated with the microgrid-based site. The microgrid-based site includes an electrical network of one or more microgrids. The method further includes determining the site control architecture for implementation on the microgrid-based site to stabilize an operation of the microgrid-based site, based, at least in part, on the one or more site operating inputs. The method includes receiving values corresponding to one or more electrical parameters associated with one or more electrical points in the microgrid-based site. Furthermore, the method includes transmitting a control message to each of the one or more stamp controllers and the one or more inverter controllers. The control message includes the values corresponding to the one or more electrical parameters and information commanding the one or more stamp controllers and the one or more inverter controllers to implement the determined site control architecture. Furthermore, the method includes facilitating each of the one or more stamp controllers and the one or more inverter controllers to operate in one of at least two control modes for implementing the determined site control architecture, in response to the control message. The at least two control modes include an Alternating Current (AC) droop control mode and a master-slave control mode.

Various embodiments of the present disclosure offer multiple advantages and technical effects. For instance, the present disclosure provides the systems and methods for reconfiguring an operation of inverters within a large and complex multi-megawatt (MW) multi-stamp site to either operate as a voltage source or a current source based on site operating requirements. Moreover, the operation of the inverters can be controlled by using control strategies, such as a master-slave control and a droop control. The feature of reconfiguring the operation of the inverters provides the flexibility of combining both the control strategies in such a way that beneficial aspects of both the control strategies can be adopted by a new site control architecture.

Further, the flexibility of selecting or switching between different control strategies based on the site operating requirements by just selecting operating modes in the one or more controllers within the site makes controlling the inverters more efficient and more reliable.

Furthermore, in the case of the large and complex MW multi-stamp site, the hybrid control architecture is preferred as this architecture eliminates the need to wire long cables which can pick up noise and result in system oscillations.

BRIEF DESCRIPTION OF THE FIGURES

For a more complete understanding of example embodiments of the present technology, reference is now made to the following descriptions taken in connection with the accompanying drawings in which.

Figure 1:
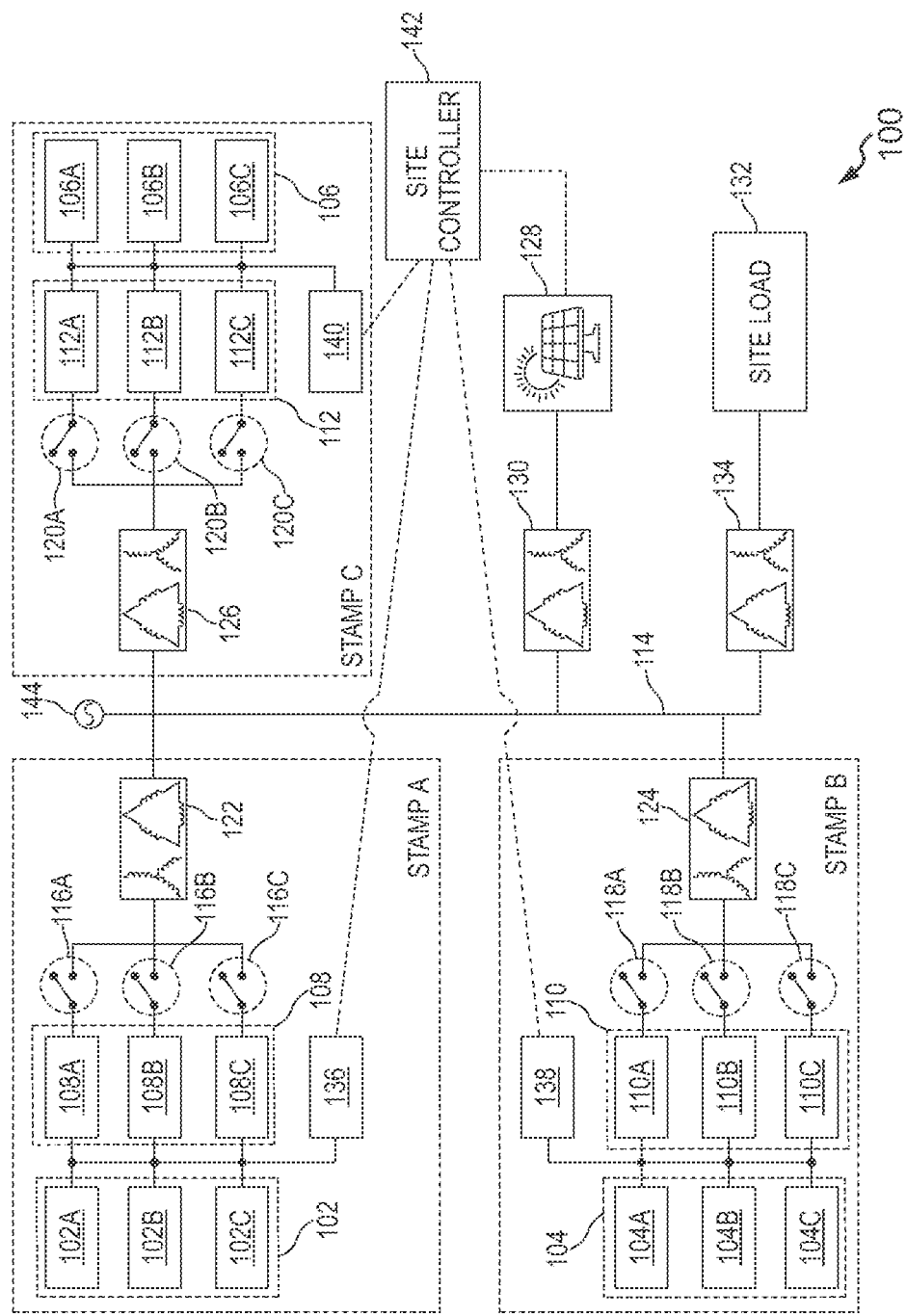
FIG. 1 illustrates an environment related to at least some examples of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art, that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification does not necessarily refer to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Although the following description contains many specifics for the purposes of illustration, anyone skilled in the art will appreciate that many variations and/or alterations are within the scope of the present disclosure. Similarly, although many of the features of the present disclosure are described in terms of each other, or in conjunction with each other, one skilled in the art will appreciate that many of these features can be provided independently of other features.

It will also be understood that when an element or layer is referred to as being "on" or "connected to" another element or layer, it can be "directly on" or "directly connected to" the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X. It will be further understood that the endpoints of each of the ranges are significant both in relation to the other endpoint, and independently of the other endpoint. Also, as would be apparent to one of ordinary skill in the art, the component "connections" described in the present disclosure are intended to refer to "electrical connections" unless otherwise specified.

Unless otherwise expressly stated, it is in no way intended that any method set forth herein be construed as requiring that its steps be performed in a specific order. Accordingly, where a method claim does not expressly recite an order to be followed by its steps or it is not otherwise specifically stated in the claims or descriptions that the steps are to be limited to a specific order, it is in no way intended that any particular order be inferred.

The terms "grid", "public grid", "electrical grid", "main grid", "power grid", "electrical power grid", and "utility" are generally used interchangeably throughout the description, and they refer to an interconnected network of one or more components for electricity delivery from producers, such as power stations to user loads. The components may include energy sources, electric substations, electrical power transmission systems, electrical power distribution systems, and the like. The grid may vary in size and can cover large areas, such as one or more cities or states. Herein, examples of the energy sources include power plants, such as hydropower plants, nuclear power plants, fossil fuel power plants, large-scale utility size fuel cell installations, etc.

The terms "load", "electric load", and "user load" may be used interchangeably throughout the description, and they refer to any component of a circuit that consumes power or energy.

The term "microgrid" refers to a local electrical grid with defined boundaries, acting as a single and controllable entity that is usually attached to a main grid but is also able to function independently. Microgrids are generally associated with power sources that locally generate electrical power that can be transmitted to end-user loads, as well as to the main grid. The power sources can include distributed energy sources associated with power conversion units in microgrids that require power conversion.

The terms "stamp", and "power stamp" are generally used interchangeably throughout the description, and they refer to a group of power sources located in a particular geographical area, collectively responsible for generating a predetermined power rating.

The term "stamp controller" refers to a control unit configured to control the operation of multiple power sources within a power stamp.

The terms "Distributed Energy Resources", "DER", "distributed energy sources", "energy sources", and "energy generators" may be used interchangeably throughout the description, and they refer to small-scale energy resources usually situated near sites of electricity use. Examples of DERs include roof top solar photovoltaic units, wind generating units, fuel cell systems, battery storage units, etc.

The term "fuel cell system" refers to a system containing electrochemical cells that convert the chemical energy of a fuel (often hydrogen) and an oxidizing agent (often oxygen) into electricity through a pair of redox reactions. The fuel cell system may contain a stack of multiple fuel cells (otherwise also referred to as electrochemical cells).

The term "power conversion unit" refers to an electrical circuit that changes the electric energy from one form to another which is a desired form optimized for a specific load. A power conversion unit generally includes an inverter coupled with an inverter controller.

The term "inverter" refers to a power electronic device that converts Direct Current (DC) to Alternating Current (AC).

The term "inverter controller" refers to a controller that controls the operation of an inverter.

The terms "grid-following mode", "grid parallel mode", and "grid-tie mode" may be used interchangeably throughout the description, and they may refer to a mode of operation of an inverter in a power conversion unit receiving power from a distributed energy source (e.g., a fuel cell system), in which the inverter tracks a voltage angle of the grid or the microgrid via an inverter controller to control an output (synchronizing to the grid or the microgrid) of the inverter.

The terms "grid-forming mode", and "islanded mode" may be used interchangeably throughout the description, and they may refer to a mode of operation of an inverter in a power conversion unit receiving power from a distributed energy source (e.g., a fuel cell system), in which the inverter actively controls the frequency and voltage output of the inverter independent of the grid via an inverter controller.

The term "AC bus" refers to a common connection between two or more devices that operate in AC.

The term "droop control" refers to a mechanism of regulating voltage and frequency by inherently regulating reactive power and active power which can be sensed locally, based on certain AC droop curves. It should be noted that droop control does not require communication between the multiple inverter controllers that may be present in the microgrid, instead, each inverter controller senses the output voltage of the inverter and controls it independently based on the AC droop curves.

The term "master-slave control" refers to a mechanism in which one "master" controller regulates a common bus voltage and sends current reference signals to all the slave systems.

The term "site controller" refers to a control unit configured to control one or more electrical devices, one or more electronic devices, one or more controllers (such as inverter controllers, stamp controllers, etc.), one or more switches, one or more units, elements, or components, a plurality of electrical sensors, and/or a plurality of electronic sensors, based on one or more operating modes and one or more operating parameters of a microgrid-based site. One or more operating modes may include a grid-following mode and a grid-forming mode. One or more operating parameters may include current, voltage, power, frequency, etc.

Overview

Various example embodiments of the present disclosure provide systems and methods for determining a site control architecture for controlling one or more inverters in a microgrid-based site (otherwise, also referred to as "site"). In an embodiment, the microgrid-based site can include an electric network of one or more microgrids having multiple Alternating Current (AC) sources connected and controlled on a single AC bus. These AC sources can operate in a grid-tie mode (as a current source) or an islanded mode (as a voltage source). The multiple AC sources generate AC power that is supplied to at least one load connected to the same AC bus. In an embodiment, the load may correspond to a local load at the site.

In some embodiments, these sources can be of the same type, receiving power from similar energy sources. In an embodiment, the AC sources may receive energy from energy sources such as Bloom Energy Servers®. In another embodiment, the energy sources can be any other type of fuel cell system. Examples of the fuel cell systems may include phosphoric acid fuel cells (PAFC), proton exchange membrane fuel cells (PEM), alkaline fuel cells (AFC), solid oxide fuel cells (SOFC), and the like. In yet another embodiment, the energy sources can be any other type of distributed energy source other than fuel cell systems, such as solar or wind energy generation systems.

In some other embodiments, a third-party source can be connected to the AC bus which also has the AC sources connected to it. Further, the third-party sources can be any other distributed energy sources, such as solar panels and/or photovoltaic (PV) panels, wind sources, biogas sources, low-power hydroelectricity, and the like.

In a specific embodiment, the multiple AC sources may correspond to power conversion units, each power conversion unit including an inverter controlled by an inverter controller. Further, each power conversion unit may receive Direct Current (DC) power from a distributed energy source. The inverter present in each power conversion unit converts DC power to AC power which is transmitted to the load or the main grid via the AC bus.

Generally, large sites can be split into multiple power stamps, each power stamp having a power rating. Each power stamp can include multiple distributed energy sources associated with multiple power conversion units for collectively generating a predetermined power based on a power rating of the corresponding power stamp. Inverters in the power conversion units and the third-party sources may be voltage sources (grid-forming inverters) or current sources (grid-following inverters). For controlling the operation of the inverters on the site, an appropriate site control architecture may have to be chosen and implemented on the site based on site operating requirements. The system disclosed in the present disclosure, facilitates restructuring of the entire microgrid or the site, based on the site operating requirements. The present disclosure provides flexibility to choose a particular site control architecture and implement it on the site by re-configuring each AC source to operate differently based on the chosen site control architecture. This re-configuration is facilitated by enabling each of one or more controllers controlling various operations within the site, to operate in at least one control mode, such as one of a master-slave control mode, and AC droop control mode. Thus, the system provides a capability to the one or more controllers to reconfigure the operation of the inverters within the site to operate either as a voltage source or a current source.

One or more controllers may include an inverter controller controlling an output voltage of an inverter in each power conversion unit, a stamp controller controlling the operation of the multiple power conversion units within a power stamp, and a site controller controlling the operation of multiple stamp controllers utilized within the site. In some embodiments, one of the multiple stamp controllers can be configured to operate as a site controller.

Further, based on the control mode in which each of the one or more controllers may operate, at least four different possible site control architectures may be implemented on the site. In an embodiment, the site control architectures can include:

1. A complete droop control architecture: In this type of site control architecture, droop control logic is implemented in each of the power conversion units, and the stamp controllers only communicate droop parameters with each other or receive droop parameters from the site controller. These droop parameters are then communicated with each of the power conversion units for achieving voltage synchronization between the inverters in each power stamp. Thus, the inverters within the power conversion units operate as voltage sources.

2. A complete master-slave control architecture: In this type of site control architecture, a master-slave control strategy is used, in which one of the stamp controllers operates as a master controller generating current references to be transmitted to slave systems. The slave systems are other stamp controllers and the power conversion units in each power stamp. Since the master controller acts as an independent voltage source, a droop control logic is not implemented. Thus, the inverters within the power conversion units operate as current sources. Further, a third-party inverter that operates as a current source can only be paralleled with this type of site control architecture.

3. A stamp level droop control architecture: In this type of site control architecture, each stamp controller acts as an independent voltage source with droop control implemented in each. Further, each stamp controller controls the operation of the power conversion units within the corresponding power stamp. Also, the inverters within the power conversion units operate as the current sources, and hence receive current references from the stamp controllers. Thus, each stamp controller acts as a master controller with the power conversion units within the respective power stamps acting as slave systems. This type of site control architecture can also be referred to as hybrid control architecture. A third-party inverter that operates either as a current source or as a voltage source can be paralleled with this type of site control architecture.

4. A site-level master-slave control architecture: This type of site control architecture is similar to the complete master-slave control architecture with the difference being droop control logic being implemented on the master controller. A third-party inverter that operates either as a current source or as a voltage source can be paralleled with this type of site control architecture.

FIG. 1 illustrates an environment 100 related to at least some examples of the present disclosure. Although the environment 100 is presented in one arrangement, other embodiments may include parts of the environment 100 arranged differently depending on, for example, a system determining a site control architecture for controlling one or more inverters in a microgrid-based site. The environment 100 depicts the microgrid-based site including a microgrid or an electrical network of one or more microgrids. The microgrid-based site can operate in a grid-tie mode or an islanded mode. In the grid-tie mode, frequency and voltage regulation is handled by a main grid. However, in the islanded mode, the site may be able to regulate internal frequency and voltage with a proper control mechanism.

The environment 100 is depicted to include one or more power stamps, such as stamp A, stamp B, and stamp C. Each stamp can generate power of a predefined power rating. The predefined power rating of each stamp can be dependent on a collective amount of energy generated by one or more energy generators in the corresponding stamp. Environment 100 also depicts one or more energy generators such as energy generators 102A, 102B, and 102C (collectively referred to as energy generators 102) in stamp A, energy generators 104A, 104B, and 104C (collectively referred to as energy generators 104) in stamp B, and energy generators 106A, 106B, and 106C (collectively referred to as energy generators 106) in stamp C.

In an embodiment, the energy generators 102, 104, and 106 may include fuel cell systems containing dozens, hundreds, or thousands of individual fuel cells. Each fuel cell generates power of a predefined capacity, and by aggregating a plurality of fuel cells with each other and/or connecting them in series, more power can be obtained. In a non-limiting implementation, each of the energy generators 102, 104, and 106 can include fuel cell systems such as solid oxide fuel cell systems. The term "solid oxide fuel cell" refers to a fuel cell that has a solid oxide or a ceramic electrolyte and produces electricity. A solid oxide fuel cell system may refer to a set of solid oxide fuel cells working together to generate power of a certain power rating.

In another embodiment, the energy generators 102, 104, and 106 may include any other distributed energy sources other than fuel cell systems. Further, the collective amount of energy generated by the energy generators 102, 104, or 106 in each power stamp may correspond to a predefined power rating of the corresponding stamp. In an example implementation, a predefined power rating can be about 300 kilowatts (KW) to about 12.5 Megawatts (MW).

Furthermore, since the energy generated by the energy generators is Direct Current (DC), one or more power conversion units, such as power conversion units 108A, 108B, and 108C (collectively referred to as power conversion units 108) are connected to the energy generators 102A-102C, respectively. Similarly, power conversion units 110A, 110B, and 110C (collectively referred to as power conversion units 110) are connected to the energy generators 104A-104C, respectively. Further, power conversion units 112A, 112B, and 112C (collectively referred to as power conversion units 112) are connected to the energy generators 106A-106C, respectively.

Each of the power conversion units 108A-108C, 110A-110C, and 112A-112C can be connected to one or more load buffer modules (not shown in FIG. 1), respectively. The load buffer modules can be used for storing excess energy generated by the energy generators 102, 104, and 106. For instance, the load buffer modules could include a battery.

Moreover, each of the power conversion units 108, 110, and 112 are controlled on a single AC bus 114. The power conversion units 108A-108C are connected to the AC bus 114 through switches 116A, 116B, and 116C, respectively. Further, a medium voltage transformer 122 may be provided for coupling the power conversion units 108A-108C to the AC bus 114. Similarly, the power conversion units 110A-110C are connected to the AC bus 114 through switches 118A, 118B, and 118C, respectively, and a medium voltage transformer 124. Further, the power conversion units 112A-112C are connected to the AC bus 114 through switches 120A, 120B, and 120C, respectively, and a medium voltage transformer 126. The environment 100 also depicts a third-party source 128 connected to the AC bus 114 through a medium voltage transformer 130. Further, all the power generated by the power conversion units 108, 110, and 112, and the third-party source 128 can be supplied to a site load 132 through a transformer 134.

The environment 100 also depicts one or more stamp controllers 136, 138, and 140 (also referred to as "stamp controllers 136, 138, and 140") for controlling the operation of the power conversion units 108, 110, and 112 in each stamp, respectively. Further, the environment 100 also depicts a site controller 142 which is a common controller such as a microgrid controller controlling the overall operation of the site. In an embodiment, the site controller 142 can also communicate with the third-party source 128 for controlling its operation. It should be noted that the site controller 142, the stamp controllers 136, 138, and 140, and the inverter controllers (described below) work together by communicating with each other. They work together to determine the site control architecture needed to control the operation of the inverters in the site which is the objective of the system proposed in the present disclosure.

In a non-limiting implementation, each of the power conversion units 108, 110, and 112 include an inverter (not shown in FIG. 1) and an inverter controller (not shown in FIG. 1) operatively coupled with each other. The inverter may be operating as a voltage source (grid-forming inverter) or as a current source (grid-following inverter) based on the site control architecture implemented at the site. Further, each inverter controller may control the output of the inverter based on the type and operation of the inverter. Each inverter along with each inverter controller within each of the power conversion units 108, 110, and 112 enables the power conversion units 108, 110, and 112 to convert the energy from DC to Alternating Current (AC). The site load 132 may include components that may need AC power for the proper functioning of components at the site. For instance, the site load 132 may include industrial appliances if the site may be an industry, home appliances if the site may be a society, educational and learning appliances if the site may be a college or an Information Technology (IT) organization, and the like.

In some embodiments, the AC power generated by the power conversion units 108, 110, and 112 can also be supplied to a main grid 144. The AC power may be supplied to the main grid 144 via the AC bus 114 as shown in FIG. 1. In a non-limiting example, the medium voltage transformers 122, 124, and 126 can be step-up transformers with a voltage step-up ratio of about 480 volts (V)/21 kilovolts (kV) as the AC bus 114 may be a high voltage AC bus which may receive power from each stamp. In an embodiment, the AC bus 114 may supply power to the site load 132, based on the requirements of the site load 132. In another embodiment, the AC bus 114 may supply power to the main grid 144 based on the requirements of the main grid 144. Further, at the load end, the power may be transmitted to the site load 132 via the transformer 134 such as a step-down transformer with a step-down ratio of about 21 kV/480 V. In a non-limiting implementation, the third-party source 128 that may be connected to the AC bus 114 can include a solar-based source, a wind energy-based source, a biogas source, and the like.

In an embodiment, the site control architecture that needs to be implemented on the site may be determined by the site controller 142 based on site operating requirements. Thus, the site controller 142 receives one or more site operating inputs associated with the microgrid-based site. The site controller 142 further determines the site control architecture for implementation on the microgrid-based site to stabilize the operation of the microgrid-based site, based, at least in part, on the one or more site operating inputs. The site controller 142 further receives values corresponding to one or more electrical parameters associated with one or more electrical points in the microgrid-based site. For example, the one or more electrical parameters include a flow of current, voltage, power, and the like at each of the one or more electrical points in the site. Each of the one or more electrical points may be equipped with one or more electrical sensors (not shown in FIG. 1) that sense the one or more electrical parameters periodically within a predefined period. For example, the one or more electrical sensors may include a current sensor, a voltage sensor, a power sensor, and the like. The site controller 142 fetches the values corresponding to the one or more electrical parameters from the one or more electrical sensors. Alternatively, the sensors may be configured to push electrical parameters to the site controller 142 at predetermined intervals.

The site controller 142 is configured to transmit a control message to each of the one or more stamp controllers 136, 138, and 140, and the one or more inverter controllers. The control message includes the values corresponding to the one or more electrical parameters and information commanding the one or more stamp controllers 136, 138, and 140 and the one or more inverter controllers to implement the determined site control architecture.

The site controller 142 is able to transmit the control signal to other controllers because the site controller 142 is communicatively coupled to them. More specifically, the site controller 142 is communicatively coupled to the one or more electrical sensors, the one or more stamp controllers 136, 138, and 140, and the one or more inverter controllers via a network (not shown in FIG. 1). The network can be a wireless or wired communication network. The network may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among entities illustrated in FIG. 1, or any combination thereof. The network may use one or more communication protocols to facilitate communication between the entities illustrated in FIG. 1. Examples of the communication protocols can include Serial Peripheral Interface (SPI) protocol, Inter-Integrated Circuit (I2C) protocol, Universal Asynchronous Receiver Transmitter (UART) protocol, Controller Area Network (CAN) protocol, etc.

In a non-limiting implementation, the network uses a CAN protocol for facilitating communication between the entities illustrated in FIG. 1. Some of the benefits of using CAN protocol in comparison to other communication protocols can include long-range, higher noise immunity, high speed, asynchronous method of communication, broadcasting capability, simple wiring, and the like.

The site controller 142 instructs each of the one or more stamp controllers 136, 138, and 140 and the one or more inverter controllers to operate in one of at least two control modes for implementing the determined site control architecture, in response to the control message. The at least two control modes include a droop control mode and a master-slave control mode.

In an embodiment, for the site controller 142 to be able to perform these operations, the site controller 142 may have to be configured with the feature provided by the system or firmware enabling the site controller 142 to receive input and determine the site control architecture to be implemented on the site. For instance, the site controller 142 may be a microgrid controller which is capable of receiving inputs and taking appropriate decisions based on pre-configured or pre-stored information. In an alternative instance, one of the stamp controllers 136, 138, and 140 is configured to operate as the site controller 142.

The site controller 142 can be configured by a user monitoring the operation of the site via a user device. For instance, the user can be an owner of the site, a service provider of the site, or any person or organization using the system proposed in the present disclosure for controlling the inverters on the site, or the like. Moreover, the user device can include any suitable electronic or computing device such as, but not limited to, a mobile phone, a tablet, a laptop, a desktop computer, a smartphone, a personal computer, an electronic tablet, a wearable device, a smart device such as smart TV or smart appliance, etc. Thus, in an instance, the site controller 142 can also be communicatively coupled to the user device via the network.

One or more site operating inputs may include the site operating requirements that need to be considered for taking decisions for providing stable operation of the site. For instance, the site operating requirements include the size of the site, the presence of the third-party source such as the third-party source 128, a mode of operation of the third-party source 128, a requirement to parallel with the grid, etc. Herein, the mode of operation of the third-party source 128 can be either grid-forming mode or grid-following mode.

The site control architecture may include one of a complete droop control architecture, a complete master-slave control architecture, a stamp level droop control architecture, and a site-level master-slave control architecture. The operation of the site upon implementation of the determined site control architecture is explained in detail in further parts of the description with reference to FIG. 2. Moreover, the operation of the site controller 142, the one or more stamp controllers 136, 138, and 140, and the one or more inverter controllers are also explained in detail in further parts of the description with reference to FIGS. 3A-3C.

It should be noted that the number of the users, the user devices, stamps, the site controller, stamp controllers, inverter controllers, energy generators, power conversion units, inverters, switches, transformers, the AC bus, the site load, and the third-party source described herein are only used for exemplary purposes and do not limit the scope of the invention. The main objective of the invention is to provide a facility for restructuring the site, based on the site operating requirements by facilitating to choose and implement the site control architecture on the site. This is facilitated by enabling each of the inverter controllers and the stamp controllers to operate in at least one control mode such as one of the master-slave control mode and the AC droop control mode. In other words, the system provides a capability to the inverter controllers, the stamp controllers, and the site controller to reconfigure the operation of the inverters within the site to operate either as a voltage source or a current source.

Figure 2:
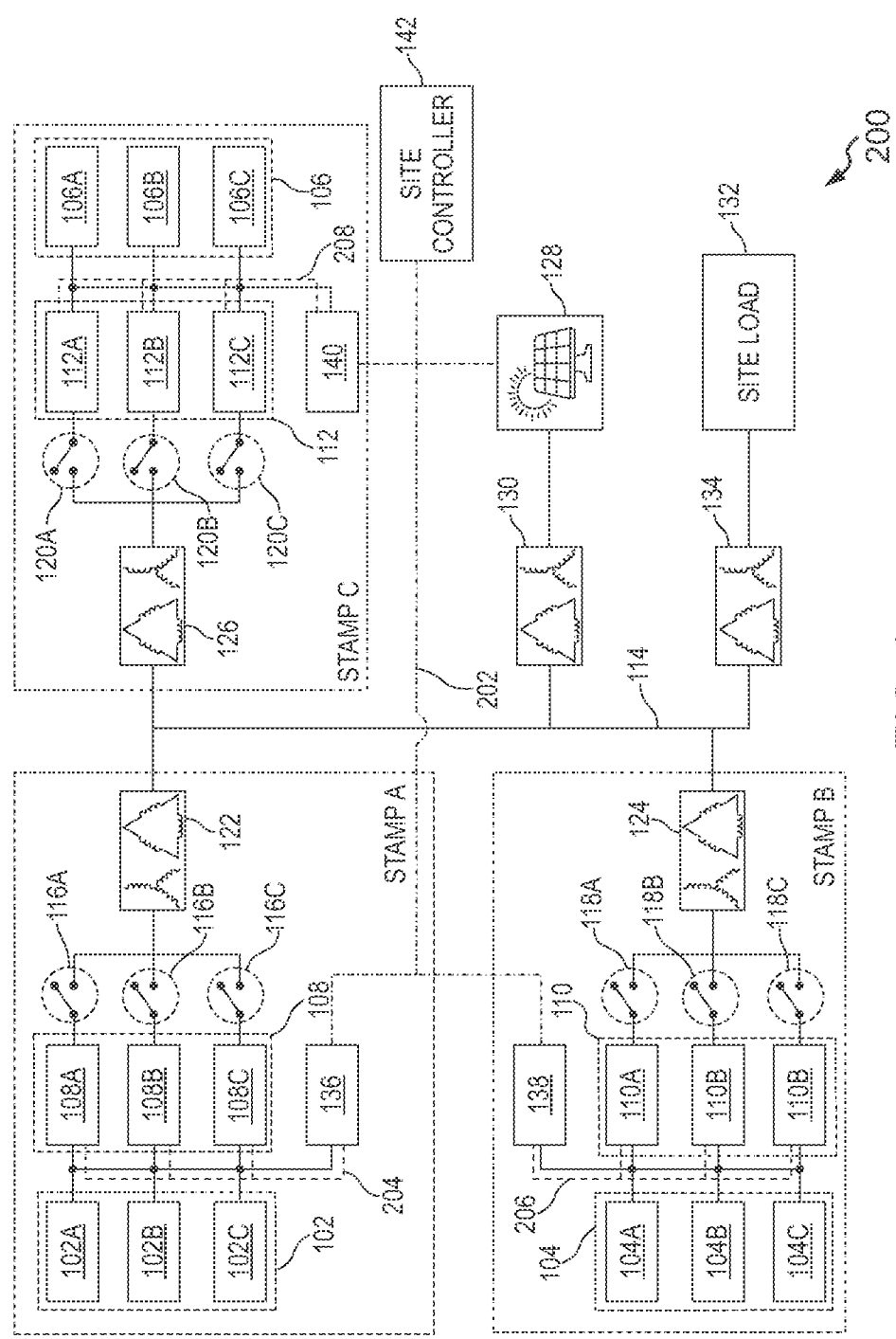
FIG. 2 is a block diagram representing a setup for a site control architecture implemented on a site, in accordance with an embodiment of the present disclosure.

FIG. 2 is a block diagram representing a setup for a site control architecture implemented on a site 200 (also referred to as "microgrid 200" or "microgrid-based site 200"), in accordance with an embodiment of the present disclosure. In an embodiment, the site 200 is similar to the environment 100 of FIG. 1. The site 200 illustrated in FIG. 2 may be a multi-MW microgrid-based site that is split into at least three power stamps, such as stamp A, stamp B, and stamp C, with each stamp having a predefined power rating. Assume that the site 200 is operating in the islanded mode in which the microgrid 200 may be disconnected from the main grid (not shown in FIG. 2) and the microgrid itself regulates the internal frequency and voltage by using one or more controllers, such as the site controller 142, the stamp controllers 136, 138, and 140, and the inverter controllers (not shown in FIG. 2) electronically or communicatively coupled with each other.

Since the site 200 is a multi-MW site, the site 200 includes a large number of power conversion units (e.g., the power conversion units 108, 110, and 112), and deciding which controlling technique to choose for controlling the operation of the power conversion units 108, 110, and 112 becomes challenging. For instance, the controlling technique may be one of an AC droop control technique and a master-slave control technique. Further, based on the controlling technique chosen, the inverter controllers and the one or more stamp controllers 136, 138, and 140 may operate in one of the at least two control modes, such as an AC droop control mode and a master-slave control mode. Thus, the system proposed in the present disclosure facilitates the site controller 142 to take this decision by using one or more site operating inputs. Thus, in the illustrated example, the one or more site operating inputs include the size of the site 200 being large as the site 200 includes a large number of inverters, the third-party source 128 is present, and an inverter of the third-party source operates as the current source, and the like.

Further, based on the control mode in which the inverter controllers and the stamp controllers 136, 138, and 140 can operate, at least four site control architectures may be obtained, that can be implemented on the site 200. A dotted line between the stamp controllers 136, 138, and 140 indicates a communication 202 of one or more parameters between the stamp controllers 136, 138, and 140, and a dotted line between the power conversion units 108, 110, and 112 and the stamp controllers 136, 138, and 140, respectively, indicates a communication 204, 206, and 208 of the one or more parameters, respectively, based on a control mode implemented by the stamp controllers 136, 138, and 140 and the inverter controllers. Thus, the possible site control architectures are as follows:

1. A complete droop control architecture: In this type of site control architecture, the AC droop control technique is implemented in each of the power conversion units 108, 110, and 112. Further, the stamp controllers 136, 138, and 140 only communicate a group of set points such as droop parameters with each other or receive the droop parameters from the site controller 142. These droop parameters are then communicated with each of the power conversion units 108, 110, and 112 for achieving voltage synchronization between the inverters in each power stamp. Thus, the inverters within the power conversion units 108, 110, and 112 operate as the voltage sources.

2. A complete master-slave control architecture: In this type of site control architecture, the master-slave control technique is used, in which one of the stamp controllers 136, 138, and 140 operates as a master controller (e.g., stamp controller 136) generating a group of set points such as current references to be transmitted to its slave systems. Thus, the terms "stamp controller 136" and "master controller 136" may be used interchangeably. The slave systems are other stamp controllers (e.g., stamp controllers 138 and 140) and the power conversion units 108, 110, and 112 in each power stamp. Since the master controller 136 acts as an independent voltage source, the AC droop control technique is not implemented. Thus, the inverters within the power conversion units 108, 110, and 112 operate as the current sources. Further, a third-party inverter which may be a part of a third-party source (e.g., solar power), operating as a current source can only be paralleled with this type of site control architecture.

3. A stamp level droop control architecture: In this type of site control architecture, each of the stamp controllers 136, 138, and 140 act as independent voltage sources with the AC droop control technique implemented in each. Further, each stamp controller 136, 138, and 140 controls the operation of the power conversion units 108, 110, and 112 within the corresponding power stamps. Also, the inverters within the power conversion units 108, 110, and 112 operate as current sources, and hence receive a group of set points such as current references from the stamp controllers 136, 138, and 140. Thus, each stamp controller 136, 138, and 140 acts as a master controller (e.g., a stamp controller 136) with the power conversion units 108, 110, and 112 within the respective power stamps (e.g., stamp A, stamp B, and stamp C) acting as slave systems. Further, this type of site control architecture can also be referred to as hybrid control architecture.

4. A site-level master-slave control architecture: This type of site control architecture is similar to the complete master-slave control architecture with the difference being the AC droop control technique being implemented on the master controller 136. Thus, a third-party inverter which is operated as a current source, or a voltage source can be paralleled with this type of site control architecture.

The hybrid control architecture is one of the site control architectures that draws beneficial aspects of both the control modes (the AC droop control mode and the master-slave control mode) when the one or more site operating inputs are as mentioned above. Therefore, the site controller 142 may determine that the hybrid control architecture needs to be implemented on the site 200 to stabilize the operation of the site 200. Further, if the hybrid control architecture is implemented on the site 200, then the communication 202 refers to the communication of the group of set points, such as the droop parameters between the stamp controllers 136, 138, and 140, as the stamp controllers 136, 138, and 140 operate in the AC droop control mode. In another embodiment, the droop parameters may not be communicated between the stamp controllers 136, 138, and 140, however, the site controller 142 may share the droop parameters with the stamp controllers 136, 138, and 140. Further, the communications 204, 206, and 208 refer to the communication of a group of set points such as the current references with the power conversion units 108, 110, and 112, as the inverter controllers operate in the master-slave control mode.

In an embodiment, the droop parameters are generated at each of the stamp controllers 136, 138, and 140 using the AC droop control technique. In another embodiment, the stamp controllers 136, 138, and 140 may receive the droop parameters from the site controller 142. The droop parameters are then converted to the current references at each of the stamp controllers 136, 138, and 140. The current references generated at the stamp controller 136 are shared with the power conversion units 108A-108C to enable the inverter controllers in stamp A to regulate an output of the inverters in stamp A. Similarly, the current references generated at stamp controller 138 are shared with the power conversion units 110A-110C to enable the inverter controllers in stamp B to regulate an output of the inverters in stamp B. Further, the current references generated at stamp controller 140 are shared with the power conversion units 112A-112C to enable the inverter controllers in stamp C to regulate an output of the inverters in stamp C.

The master-slave control mode provides a faster dynamic response using current references such as AC references when used in the inverter controllers within each stamp (e.g., stamp A, stamp B, and stamp C). The master-slave control mode provides a faster dynamic response because the power conversion units 108, 110, and 112 are placed close to each other within each stamp. Similarly, the AC droop control mode is used to share power between the power stamps such as stamp A, stamp B, and stamp C, by looking at voltage on the medium voltage transformers.

In another instance, when the complete droop control architecture is implemented on the site 200, the communication 202 refers to the communication of the group of set points such as the droop parameters between the stamp controllers 136, 138, and 140, as the stamp controllers 136, 138, and 140 operate in the AC droop control mode. In an embodiment, the droop parameters can be shared by the site controller 142 to the stamp controllers 136, 138, and 140 through this communication 202. Further, the communications 204, 206, and 208 refer to the communication of the droop parameters with the power conversion units 108, 110, and 112, as the inverter controllers are also operating in the AC droop control mode. Further, the inverter controllers regulate the output of the inverters in stamp A, stamp B, and stamp C, based on the droop parameters received from stamp controllers 136, 138, and 140, respectively.

In yet another instance, when the complete master-slave control architecture is implemented on the site 200, one of the stamp controllers 136, 138, and 140 operates as a constant voltage source which generates a constant voltage and constant frequency. The constant voltage source further acts as a master controller (e.g., the stamp controller 136), and hence converts the generated constant voltage into current references which are also referred to as a group of set points that the master controller 136 generates. Thus, the communication 202 illustrated in FIG. 2 refers to the communication of the current references with slave systems such as other stamp controllers (e.g., the stamp controllers 138 and 140). Further, the communications 204, 206, and 208 illustrated in FIG. 2 refer to the communication of the current references with other slave systems, such as the power conversion units 108, 110, and 112 in each power stamp. In such a site 200, the third-party source 128 that can be controlled on the AC bus 114 has to have an inverter that operates as a current source.

Further, in yet another instance, when the site level master-slave control architecture is implemented on the site 200, one of the stamp controllers 136, 138, and 140 operates as a voltage source which is made to operate in the AC droop control mode, and hence generates the droop parameters. The voltage source further acts as a master controller (e.g., the stamp controller 136), and hence converts the droop parameters into current references which are also referred to as a group of set points that the master controller 136 generates. Thus, the communication 202 illustrated in FIG. 2 refers to the communication of the current references with slave systems such as other stamp controllers (e.g., the stamp controllers 138 and 140). Further, the communications 204, 206, and 208 illustrated in FIG. 2 refer to the communication of the current references with slave systems, such as the power conversion units 108, 110, and 112 in each power stamp. In such a site 200, the third-party source 128 that can be controlled on the AC bus 114 can have an inverter that can be either operated as a voltage source or a current source.

Therefore, in some embodiments, upon determining the site control architecture that needs to be implemented on the site 200, the site controller 142 receives values corresponding to the one or more electrical parameters associated with one or more electrical points in the site 200. Further, the site controller 142 generates a control message that needs to be transmitted to each of the stamp controllers 136, 138, and 140 and the power conversion units 108, 110, and 112. The site controller 142 transmits the control message. The control message includes the values corresponding to the one or more electrical parameters and information commanding the stamp controllers 136, 138, and 140 and the inverter controllers to implement the determined site control architecture. Furthermore, the site controller 142 facilitates each of the stamp controllers 136, 138, and 140 and the inverter controllers to operate in one of the at least two control modes for implementing the determined site control architecture, in response to the control message.

Upon transmitting the control message, each of the stamp controllers 136, 138, and 140 receives the control message. Further, the stamp controllers 136, 138, and 140 operate in a first control mode of the at least two control modes for implementing the determined site control architecture, in response to the control message. For instance, the first control mode includes one of the AC droop control mode and the master-slave control mode. Furthermore, the stamp controllers 136, 138, and 140 calculate a group of set points corresponding to the one or more power supply parameters to be regulated at the inverters connected to the site 200. The stamp controllers 136, 138, and 140 calculate the group of set points, based at least on, the values, the first control mode in which the stamp controllers 136, 138, and 140 operate, and a second control mode of the at least two control modes in which the inverter controllers operate. For instance, the second control mode includes one of the AC droop control mode and the master-slave control mode.

Moreover, the stamp controllers 136, 138, and 140 transmit the group of set points to the inverter controllers, for regulating the one or more power supply parameters associated with the inverters to stabilize the operation of the site 200. For instance, the group of set points includes droop parameters when the determined site control architecture implemented on the site 200 includes the complete droop control architecture. In another instance, the group of set points includes analog current reference values when the determined site control architecture implemented on the site 200 includes one of the complete master-slave control architecture, the stamp level droop control architecture, and the site level droop control architecture.

Lastly, the inverter controllers in each stamp receive the control message from the site controller 142, and the first group of set points from the stamp controllers 136, 138, and 140. The inverter controllers further operate in the second control mode of the at least two control modes for implementing the determined site control architecture, in response to the control message. Further, the inverter controllers regulate the one or more power supply parameters at the output of the inverters connected to the site 200 to stabilize the operation of the site 200. The inverter controllers regulate the power supply parameters, based at least on the group of set points and the second control mode in which the inverter controllers operate.

Figure 3A:
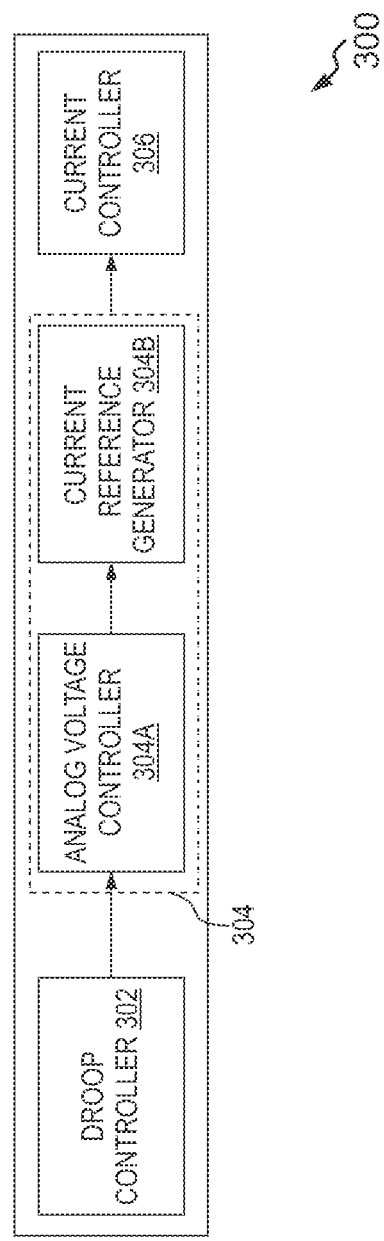
FIG. 3A is a simplified block diagram representing a control logic controlling various operations within a site, in accordance with an embodiment of the present disclosure.

FIG. 3A is a simplified block diagram representing a control logic 300 controlling various operations within the site 200, in accordance with an embodiment of the present disclosure. For instance, the control logic 300 is implemented in at least one of the stamp controllers 136, 138, and 140 and the power conversion units 108, 110, and 112. The control logic 300 includes a droop controller 302, an analog current reference generator 304, and a current controller 306 communicatively coupled with each other. The analog current reference generator 304 further includes an analog voltage controller 304A and a current reference generator 304B communicatively coupled with each other. It should be noted that all the components depicted as part of the control logic 300 are partially or completely implemented in any of the stamp controllers 136, 138, and 140 and the power conversion units 108, 110, and 112 without limiting the scope of the invention. In other words, one or more of the components may be activated and deactivated depending on the control message received by the stamp controllers 136, 138, and 140 and the inverter controllers of the power conversion units 108, 110, and 112 from the site controller 142.

In an embodiment, each of the stamp controllers 136, 138, and 140 and the inverter controllers are configured with the control logic 300 in the form of firmware. Thus, upon receiving the control message, at least one of a droop control flag and a reference current generation flag are activated within each of the stamp controllers 136, 138, and 140 and the inverter controllers, based on the control message.

In scenarios when the control message commands the stamp controllers 136, 138, and 140 and the inverter controllers to implement the complete droop control architecture, the droop control flag may have to be activated, and the reference current generation flag may have to remain deactivated. Upon activation of the droop control flag, the droop controller 302 generates the droop parameters by implementing the AC droop control technique. In such scenarios, the droop controller 302 may be activated in the power conversion units 108, 110, and 112. The analog current reference generator 304 and the current controller 306 remain deactivated. The site controller 142 merely performs the operation of transmitting the droop parameters to the stamp controllers 136, 138, and 140. The AC droop control technique implemented by the droop controller 302 is explained in detail with reference to FIG. 3B.

In scenarios when the control message commands the stamp controllers 136, 138, and 140 and the inverter controllers to implement the complete master-slave control architecture, one of the stamp controllers 136, 138, and 140 acts as the master controller (e.g., a stamp controller 136), upon receiving the control message. However, the master controller 136 acts as a constant voltage source, and the AC droop control technique need not be implemented. Therefore, upon receiving the control message, the droop control flag is deactivated, and the current reference generation flag is activated. Further, the voltage generated by the master controller 136 is converted to analog current reference values by the analog current reference generator 304 of the master controller 136. The analog current reference values are then transmitted to the inverter controllers, for the inverter controllers to control an output of the inverters based on the analog current reference values. Thus, it may be understood that the current controller 306 may now be activated in the power conversion units 108, 110, and 112 for controlling the analog current reference values received by the inverter controllers. Further, the generation of the analog current reference values and the process of controlling them are explained with reference to FIG. 3C.

In scenarios when the control message commands the stamp controllers 136, 138, and 140 and the inverter controllers to implement the stamp level droop control architecture, each of the stamp controllers 136, 138, and 140 act as independent voltage sources with the AC droop control technique being implemented on each. Thus, the droop control flag is activated in the stamp controllers 136, 138, and 140, thereby enabling the droop controller 302 to generate the droop parameters. Further, in the stamp-level droop control architecture, the inverter controllers operate in the master-slave control mode. Thus, the current reference generation flag is activated in the stamp controllers 136, 138, and 140 and the inverter controllers, and hence the analog reference current generator converts the droop parameters into the analog current reference values. Further, the analog current reference values are then transmitted to the inverter controllers, for the inverter controllers to regulate the output of the inverters based on the analog current reference values. Thus, it may be understood that the current controller 306 is activated in the power conversion units 108, 110, and 112 for controlling the analog current reference values received by the inverter controllers.

Further, in scenarios when the control message commands the stamp controllers 136, 138, and 140 and the inverter controllers to implement the site level master-slave control architecture, one of the stamp controllers 136, 138, and 140 acts as the master controller (e.g., a stamp controller 136), upon receiving the control message. Further, the master controller 136 acts as an independent voltage source with the AC droop control technique being implemented. Therefore, upon receiving the control message, the droop control flag and the current reference generation flag are activated. Further, the droop controller 302 generates droop parameters and the droop parameters are converted to analog current reference values by the analog current reference generator 304 of the master controller 136. The analog current reference values are then transmitted to the inverter controllers, for the inverter controllers to control an output of the inverters based on the analog current reference values. Thus, it may be understood that the current controller 306 may now be activated in the power conversion units 108, 110, and 112 for controlling the analog current reference values received by the inverter controllers.

Figure 3B:
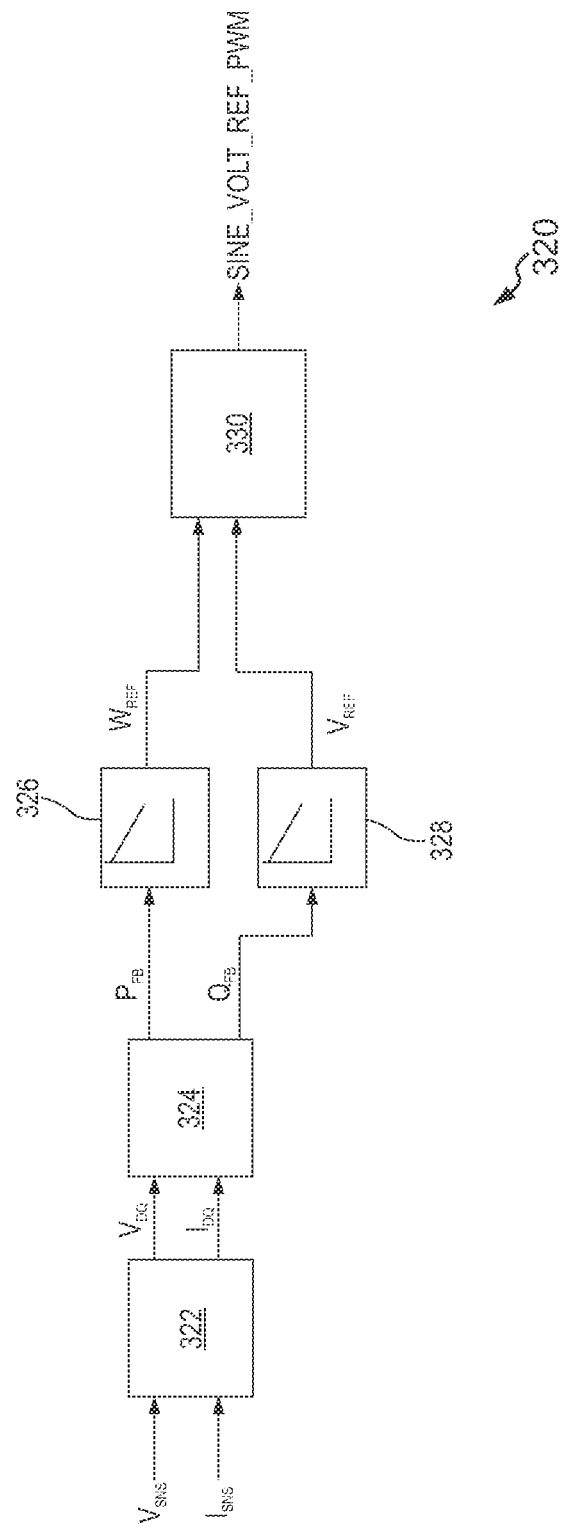
FIG. 3B is a schematic representing a droop controller, in accordance with an embodiment of the present disclosure.

FIG. 3B is a schematic representing a droop controller 320, in accordance with an embodiment of the present disclosure. In an embodiment, when the droop control flag is activated, the droop controller 320 is activated. The droop controller 320 is configured to receive voltage and current values (VSNS and ISNS) sensed by one of the stamp controllers 136, 138, and 140 and the inverter controllers from the grid. Upon receiving the voltage and current values, a transformation module 322 performs a Park transformation on the voltage and current values for generating a direct-quadrature-zero (dq0) rotating reference frame for each of the VSNS and ISNS. As used herein, the term "Park transformation" refers to a tensor that rotates the reference frame of a three-element vector or three-by-three-element matrix in an effort to simplify analysis. The Park transformation is used in the context of electrical engineering with three-phase circuits. The Park transformation can be used to rotate the reference frames of AC waveforms such that they become DC signals. Simplified calculations can then be carried out on these DC quantities.

The DC quantities, such as DC voltage and DC current ($V_{DQ}$ and $I_{DQ}$) obtained from the transformation module 322, are given to a power calculation module 324. The power calculation module 324 calculates an active power feedback ($P_{FB}$) and a reactive power feedback ($Q_{FB}$) from the DC quantities. Later, the active power feedback is passed through a frequency-watt droop module 326 to generate a frequency reference ($W_{REF}$), and the reactive power feedback is passed through a voltage-VAR droop module 328 to generate a voltage reference ($V_{REF}$). Further, a sinusoidal voltage reference signal is generated by passing the frequency reference and the voltage reference through a sine reference generator module 330. The generated sinusoidal voltage reference signal is then fed to an analog current reference generator. The operations performed on the sinusoidal voltage reference signal by the analog current reference generator are explained in the present disclosure with reference to FIG. 3C.

Traditionally, the droop control logic is employed in grid-connected power plants which are synchronous machine-based. AC droop curves control the power export to a grid and maintain grid synchronization. Further, it works on the basic principle of the frequency difference between different sources which are a part of the grid that creates power flow. The frequency and voltage of the grid are controlled by the synchronous machines connected to the grid. However, in islanded mode, i.e., when disconnected from the grid, typically, most of the connected AC sources behave as current sources. The voltage of the AC bus is controlled by synchronous generators (Voltage source). Further, the inertia of the AC bus depends on the inertia of the synchronous generators. Moreover, standards, such as the Institute of Electrical and Electronics Engineers (IEEE) and International Electrotechnical Commission (IEC) introduced dynamic behaviors such as freq-watt, volt-var, volt-watt, etc., for current sources to stabilize the grid.

In addition, all the voltage sources contribute to the dynamics of the AC bus in the microgrid. If the dynamics of each of the voltage sources connected are the same, the inertia of the system scales. Further, with dissimilar voltage sources, load sharing and matching the dynamic behavior becomes a concern as synchronous generators cannot be used. As a result, a droop control technique implemented by the droop controller 302 is introduced.

A process of load sharing and power sharing involved in the implementation of the droop control technique is further explained using a two-source model (e.g., power conversion units 108A and 110A). In a non-limiting implementation, load sharing depends on three parameters, such as phase angle difference ($\theta_1-\theta_2$), voltage difference ($V_1-V_2$) and the impedance ratio ($Z_1/Z_2$) between the two sources. As the source impedance is typically inductive, real power (P) sharing depends on phase angle, while reactive power (Q) sharing depends on voltage difference. In an embodiment, for purely reactive source impedance (Z=X) the circulating power such as real circulating power ($P_{circ}$) and reactive circulating power ($Q_{circ}$) between the sources can be given by following power equations:

$$P_{circ} = \frac{V_1 * V_2 * \sin(\theta_1 - \theta_2)}{X_1 + X_2} \qquad \text{Eqn. 1}$$

$$Q_{circ} = \frac{V_1 * (V_1 - V_2 * \cos(\theta_1 - \theta_2))}{X_1 + X_2} \qquad \text{Eqn. 2}$$

Further, in a non-limiting implementation, for power sharing, the sources (e.g., power conversion units 108, 110, and 112) in the microgrid (e.g., the site 200) will have droop characteristics set by the microgrid controller (e.g., the site controller 142) as per the installed power capacities. The droop curve adjusts the phase angle of the individual sources such that at steady state, the power-sharing is governed by the steady state operating frequency ($\omega_0$). Furthermore, stability and the response of the droop control depend on the individual impedance of the connected sources in the system. The power-sharing can be changed either by adjusting the no-load frequency ($\omega_{nL}$) of the droop curve or by adjusting the slope (m) of the droop curve.

Later, synchronization may be achieved using the droop curve. In order to explain the synchronization using the droop curve, a steady state condition where a frequency error of $\Delta\omega$ is introduced into one of the sources may be assumed. Suppose the frequency error results in phase difference between the sources resulting in power difference given by the following equation:

$$\Delta\omega \rightarrow \Delta\theta \rightarrow \Delta P \rightarrow \Delta\omega_{new}(-m*\Delta P) \qquad \text{Eqn. 3}$$

As a result, droop control provides negative feedback to adjust the frequency such that the synchronism is maintained at a steady state, thereby maintaining power-sharing. Further, stability and the response of the droop control depend on the individual impedance of the connected sources in the system. Different embodiments where the droop controller 320 can be applied are explained in the present disclosure with reference to FIGS. 5A, 5B, and 5C.

Moreover, in a non-limiting implementation, an experiment is conducted to validate the control logic of the droop controller 320. The experiment includes a scaled-down system-level test in which each stamp is considered to include three AC source modules (i.e., three power conversion units). For example, the three power conversion units in stamp A include power conversion units 108A-108C, in stamp B include power conversion units 110A-110C, and in stamp C include power conversion units 112A-112C. Steady-state regulation for real power (P) and reactive power (Q) sharing is captured and documented as shown below:

TABLE 1

Active power measured at AC source modules in each stamp

| S. No. | Stamp | AC source module | Active Power (W) | | | |
|---|---|---|---|---|---|---|
| | | | Phase A | Phase B | Phase C | Total |
| 1 | A | 108A | 5105 | 4500 | 4333 | 13938 |
| 2 | | 108B | 5760 | 5840 | 5558 | 17158 |
| 3 | | 108C | 4454 | 4952 | 4558 | 13964 |
| 4 | B | 110A | 9009 | 6201 | 5423 | 20633 |
| 5 | | 110B | 3132 | 5324 | 4997 | 13453 |
| 6 | | 110C | 4979 | 4661 | 4636 | 14276 |
| 7 | C | 112A | 4354 | 4599 | 4485 | 13438 |
| 8 | | 112B | 4420 | 4430 | 4025 | 12875 |
| 9 | | 112C | 5440 | 5620 | 4685 | 15745 |
| 10 | Total load(W/VAR) | | 46653 | 46127 | 42700 | 135480 |

TABLE 2

Reactive power measured at AC source modules in each stamp

| S. No. | Stamp | AC source module | Reactive Power (W) | | | |
|---|---|---|---|---|---|---|
| | | | Phase A | Phase B | Phase C | Total |
| 1 | A | 108A | 5397 | 5868 | 5511 | 16776 |
| 2 | | 108B | 4145 | 4397 | 4331 | 12873 |
| 3 | | 108C | 5008 | 6226 | 5639 | 16873 |
| 4 | B | 110A | 4777 | 6738 | 5595 | 17110 |
| 5 | | 110B | 4895 | 4840 | 5727 | 15462 |
| 6 | | 110C | 3186 | 3370 | 3317 | 9873 |
| 7 | C | 112A | 4485 | 5337 | 4993 | 14815 |
| 8 | | 112B | 4381 | 5566 | 4882 | 14829 |
| 9 | | 112C | 5708 | 5435 | 5023 | 16166 |
| 10 | Total load (W/VAR) | | 41982 | 47777 | 45018 | 13477 |

It may be understood that Table 1 shows active power generated at all the AC source modules, i.e., the power conversion units 108, 110, and 112 along with the total active power that each stamp generates. It should be noted that the total power that each stamp generates corresponds to the total load that it can operate. Similarly, Table 2 shows the reactive power generated at all the AC source modules 108, 110, and 112 along with the total reactive power that each stamp generates.

Figure 3C:
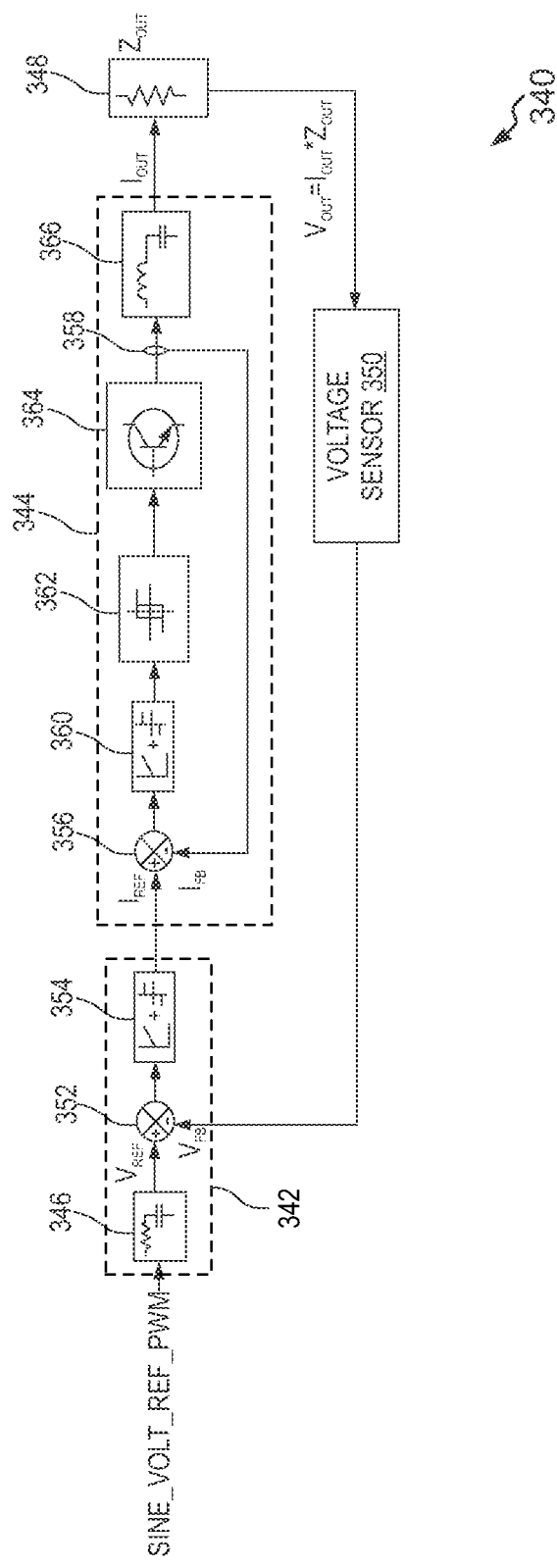
FIG. 3C is a schematic representing an analog current reference generator and a current controller, in accordance with an embodiment of the present disclosure.

Referring to FIG. 3C, which is a schematic 340 representing an analog current reference generator 342 and a current controller 344, in accordance with an embodiment of the present disclosure. The sinusoidal voltage reference signal received from the droop controller 320, is initially passed through a filter such as a Resistance-Capacitor (RC) filter 346. The RC filter 346 filters any noise associated with the sinusoidal voltage reference signal and provides a filtered voltage reference ($V_{REF}$).

The site 200 includes the site load such as a load 348 as shown in FIG. 3C. The load 348 is similar to the site load 132 of FIG. 1. Voltage across the load 348 is taken as a feedback voltage ($V_{FB}$) via a voltage sensor 350, which is given to a voltage subtractor 352 that subtracts the feedback voltage from the filtered voltage reference for obtaining a difference voltage value. The difference voltage value is fed to a voltage controller 354. The voltage controller 354 generates an analog current reference value ($I_{REF}$). The analog current reference value is transmitted to the current controller 344. In some embodiments, the current controller 344 associated with the power conversion units 108, 110, and 112 may be activated. In such embodiments, the analog current reference value may be transmitted to the inverter controllers of the power conversion units 108, 110, and 112.

The current controller 344 includes a current subtractor 356. Current feedback ($I_{FB}$) is taken from a point 358 as shown in FIG. 3B and given to the current subtractor 356. The current subtractor 356 subtracts the current feedback from the analog current reference value for generating a difference current. The current controller 344 further includes a current controlling module 360, a hysteretic controller 362, and an H-bridge module 364 that operate together for converting the DC energy to AC energy based on the analog current reference value. It should be noted that the process of conversion from DC to AC energy is known to a person skilled in the art and hence not disclosed in the present disclosure for the sake of brevity. An output current thus obtained is then passed through a filter such as an inductance-capacitance (L-C) filter 366. The filtered current ($I_{OUT}$) thus obtained is then transmitted to the load (e.g., the site load 348) for its operation.

Figure 4:
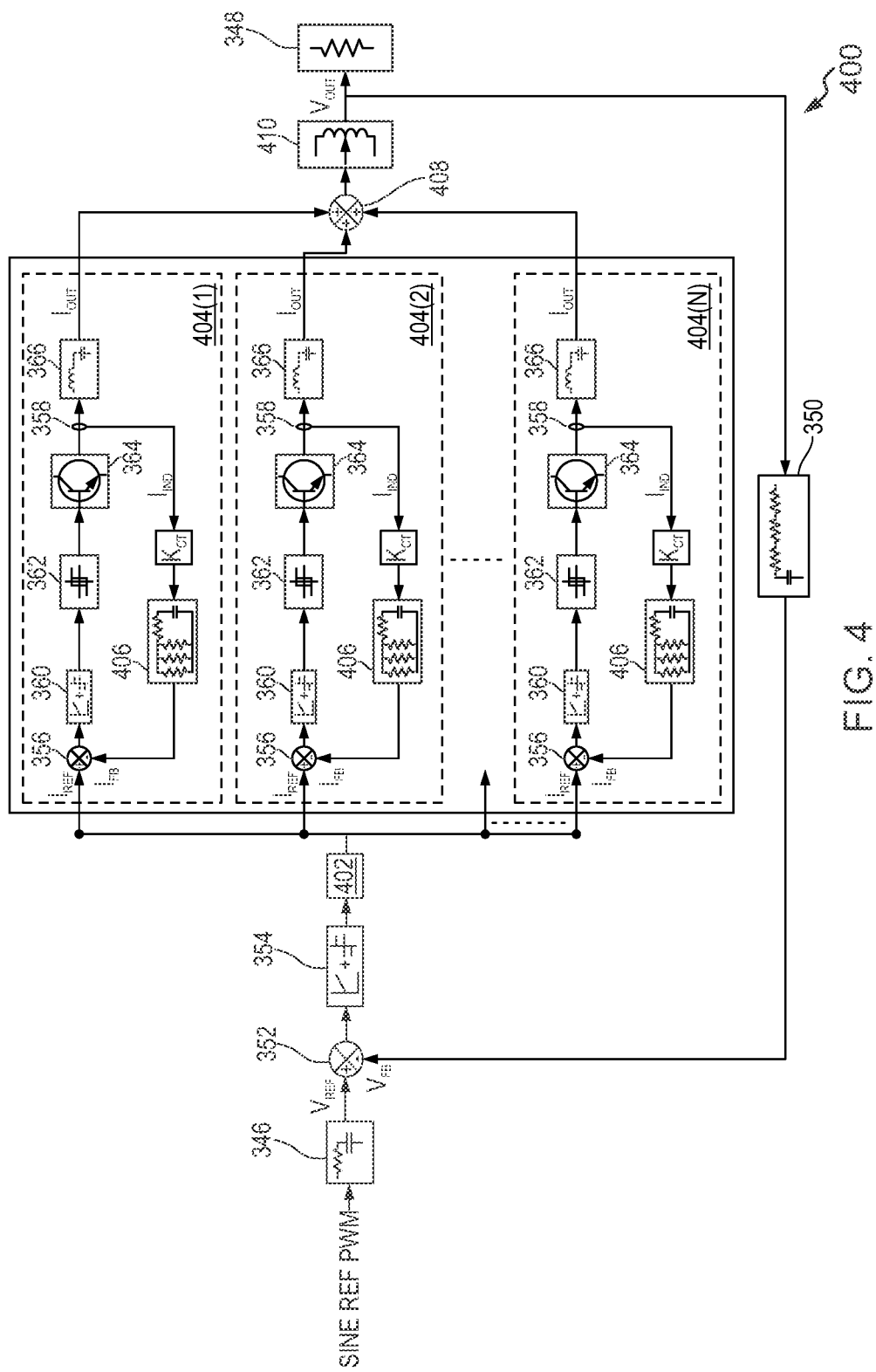
FIG. 4 is a schematic representing a scenario in which the current controller is shown active in a power conversion unit, in accordance with an embodiment of the present disclosure.

FIG. 4 is a schematic 400 representing a scaled-up version of inverter voltage control as shown in FIG. 3C where the analog current reference signal ($I_{REF}$) is amplified by a number of inverters 'N'. FIG. 4 shows the RC filter 346, the voltage subtractor 352, and the voltage controller 354 which perform operations that are explained with reference to FIG. 3C.

The analog current reference value ($I_{REF}$) generated by the voltage controller 354 is then passed through a multiplier 402 as shown in FIG. 4. The operation of the multiplier 402 is to duplicate the analog current reference value a predefined number of times. The number of times the analog current reference value needs to be duplicated may depend on the count of inverters that may be present in the power conversion unit 108A. Suppose the power conversion unit 108A includes 'N' number of inverters as shown in FIG. 4, that is, 404(1), 404(2), ... 404(N). Herein, 'N' is a non-zero natural number.

In the illustrated scenario, the current controller 344 is shown to be implemented within each of the inverters 404(1)-404(N). Thus, it can be stated that each inverter of the inverters 404(1)-404(N) receives $I_{REF}$ independently, and the control logic of the current controller 344 operates independently on each $I_{REF}$. Herein, the current subtractor 356 performs the operation as explained with reference to FIG. 3C. However, in an example, the Inductor current feedback ($I_{IND}$) taken from the point 358, is applied with a current sensor gain coefficient ($K_{CT}$). Later, the current signal is passed through a current sensor 406. In a non-limiting example, the current sensor 406 may include a circuitry or a control logic that performs operations, such as current scaling and filtering (e.g., LPF operation). These operations may be performed to eliminate any disturbances or noises that might have affected the current signal at the point 358. Thus, the current feedback ($I_{FB}$) may be obtained upon scaling $I_{IND}$ to an appropriate level and filtering from high-frequency components (noise signals) which is then provided to the current subtractor 354.

In an embodiment, the difference current obtained from the current subtractor 356 is given to the current controlling module 360, the hysteretic controller 362, and the H-bridge module 364 that operate together for converting the DC energy to AC energy based on the analog current reference value $I_{REF}$. An output current thus obtained is then passed through a filter such as the L-C filter 366. Filtered current ($I_{OUT}$) thus obtained from each inverter i.e., the inverters 404(1)-404(N) are added together using a summer module 408. Output of the summer module 408 is then transmitted to the load 132 through a transformer 410 for its operation.

Figure 5A:
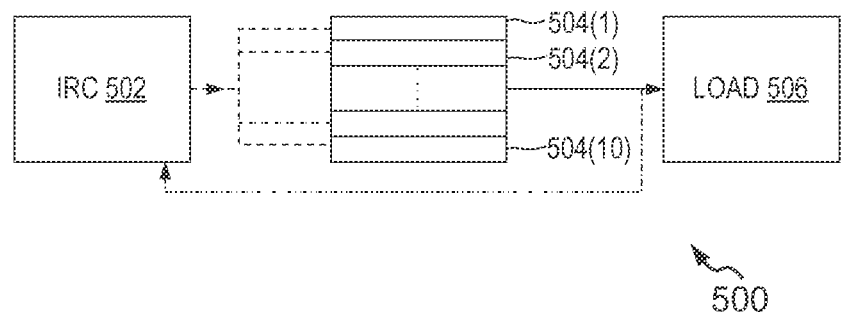
FIG. 5A is a simplified block diagram representing a droop control architecture that implements the droop controller in a power conversion unit when a site operates in an islanded mode, in accordance with an embodiment of the present disclosure.

FIG. 5A is a simplified block diagram representing a droop control architecture 500 that implements the droop controller (e.g., droop controller 320) in one of the power conversion units (e.g., the power conversion units 108, 110, and 112) when the site 200 operates in the islanded mode, in accordance with an embodiment of the present disclosure. The power conversion unit 108, 110, or 112 includes the inverter controller such as an inverter redundant controller (IRC) 502. The power conversion unit 108, 110, or 112 further includes a predefined count of the inverters, such as inverters 504(1), 504(2), ... 504(10). It should be noted that the predefined count is considered to be about ten for explanation purposes, however, the predefined count may be more or less than ten. Also, in a non-limiting implementation, the IRC 502 may control the operation of the inverters 504(1)-504(10), however, more than a single IRC may also be used to control the operation of the inverters 504(1)-504(10).

The output of the inverters 504(1)-504(10) may be connected to a load 506. The IRC 502 receives feedback from the output of the inverters 504(1)-504(10) continuously after every predefined period. The feedback may include voltage values and frequency values. The IRC 502 along with the inverters 504(1)-504(10) implement the control logic of the droop controller 200 for generating voltage that is needed by the load 506 to operate. The control logic of the droop controller 320 implemented in the power conversion units 108, 110, and 112 is explained further with reference to FIG. 5B.

Figure 5B:
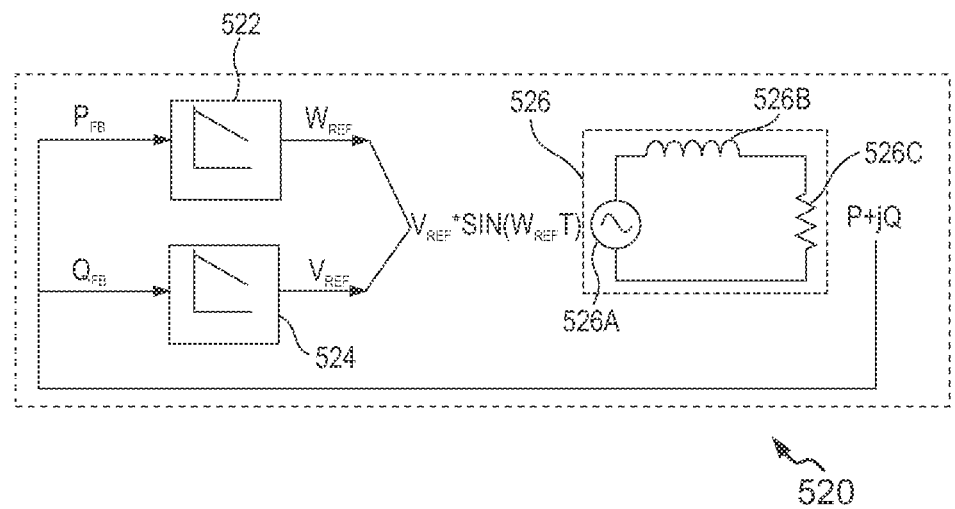
FIG. 5B is a detailed schematic representing a control logic of the droop controller implemented in a power conversion unit when a site operates in the islanded mode, in accordance with an embodiment of the present disclosure.

FIG. 5B is a depiction of a circuit 520 representing the control logic of the droop controller (e.g., droop controller 320) implemented in the power conversion units 108, 110, or 112 when the site (e.g., the site 200) operates in the islanded mode, in accordance with an embodiment of the present disclosure. In the islanded mode, the IRC 502 along with the inverters acts as a voltage source. Thus, an active power feedback ($P_{FB}$) and a reactive power feedback ($Q_{FB}$) are calculated within the IRC 502. Later, the active power feedback is passed through a frequency-watt droop module 522 to generate a frequency reference ($W_{REF}$), and the reactive power is passed through a voltage-VAR droop module 524 to generate a voltage reference ($V_{REF}$). Further, a sinusoidal voltage reference signal is generated by passing the frequency reference and the voltage reference through a sine reference voltage generator module Element 526 represents a source-load model where a voltage source 526A that represents the amplified sinusoidal voltage reference ($V_{REF}$) is connected to a load 526C through source impedance 526B. The active power and reactive power parameters generated by the source 526A are read and fed back to the IRC 502 as feedback, and the process repeats.

Figure 5C:
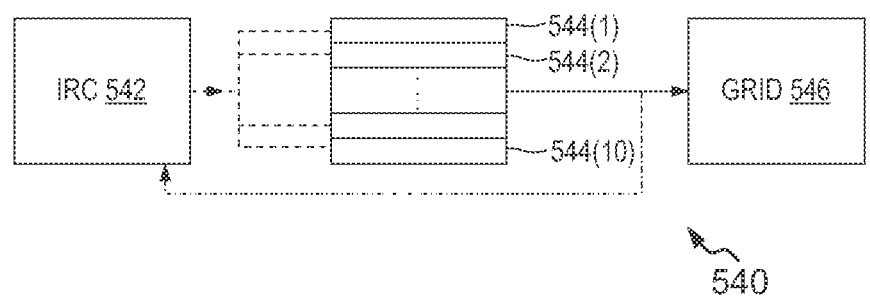
FIG. 5C is a simplified block diagram representing a droop control architecture that implements the droop controller in a power conversion unit when a site operates in a grid-tie mode, in accordance with an embodiment of the present disclosure.

FIG. 5C is a simplified block diagram representing a droop control architecture 540 that implements the droop controller (e.g., droop controller 320) in one of the power conversion units (e.g., the power conversion units 108, 110, and 112) when the site 200 operates in the grid-tie mode, in accordance with an embodiment of the present disclosure. The power conversion unit 108, 110, or 112 includes the inverter controller such as an IRC 542. The IRC 542 is substantially similar to the IRC 502. The power conversion unit 108, 110, or 112 further includes a predefined count of the inverters, such as inverters 544(1), 544(2), ... 544(10). The inverters 544(1)-544(10) are substantially similar to the inverters 504(1)-504(10). It should be noted that the predefined count is considered to be about ten for explanation purposes, however, the predefined count may be more or less than ten. Also, in a non-limiting implementation, the IRC 542 may control the operation of the inverters 544(1)-544 (10), however, more than a single IRC may also be used to control the operation of the inverters 544(1)-544(10).

The output of the inverters 544(1)-544(10) may be connected to a grid 546. The IRC 542 receives feedback from the output of the inverters 544(1)-544(10) after every predefined period. The feedback may include voltage values and frequency values. The IRC 542 along with the inverters 544(1)-544(10) implement the control logic of the droop controller 200 for generating voltage that is needed by the grid 546 to operate.

Figure 6A:
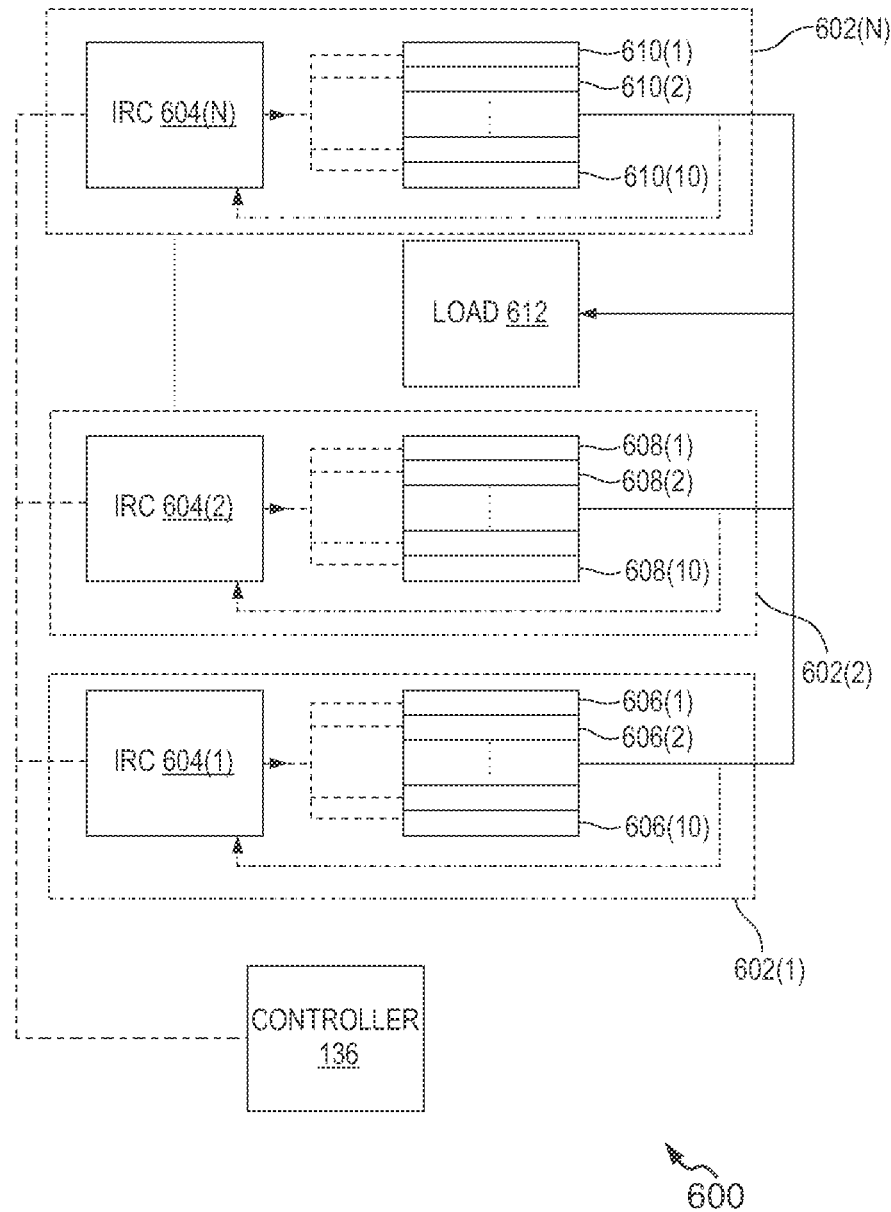
FIG. 6A is a simplified block diagram representing a droop control architecture upon implementation of the AC droop control technique on the power conversion units in one or more power stamps, in accordance with an embodiment of the present disclosure.

FIG. 6A is a simplified block diagram representing a droop control architecture 600 upon implementation of the AC droop control technique on power conversion units 602(1), 602(2), . . . 602(N) in the one or more power stamps (e.g., stamp A), in accordance with an embodiment of the present disclosure. The power conversion unit 602(1) includes an IRC 604(1) controlling an operation of inverters 606(1), 606(2), . . . 606(10). Similarly, the power conversion unit 602(2) includes an IRC 604(2) controlling an operation of inverters 608(1), 608(2), . . . 608(10). Thus, the power conversion unit 602(N) includes an IRC 604(N) controlling an operation of inverters 610(1), 610(2), . . . 610(10). All the power conversion units 602(1), 602(2), . . . 602(N) are transmitting AC power to the load 612 via the AC bus 114.

In an embodiment, the controller 136 generates and transmits the droop parameters to the IRCs 604(1), 604(2), . . . 604(N). The IRCs 604(1), 604(2), . . . 604(N) generate analog current reference values by taking feedback from the output of the inverters 606(1), 606(2), . . . 606(10), 608(1), 608(2), . . . 608(10), and 610(1), 610(2), . . . 610(10) individually and respectively. The generated analog current reference values are transmitted to the inverters 606(1), 606(2), . . . 606(10), 608(1), 608(2), . . . 608(10), and 610(1), 610(2), . . . 610(10), thereby regulating their output.

Figure 6B:
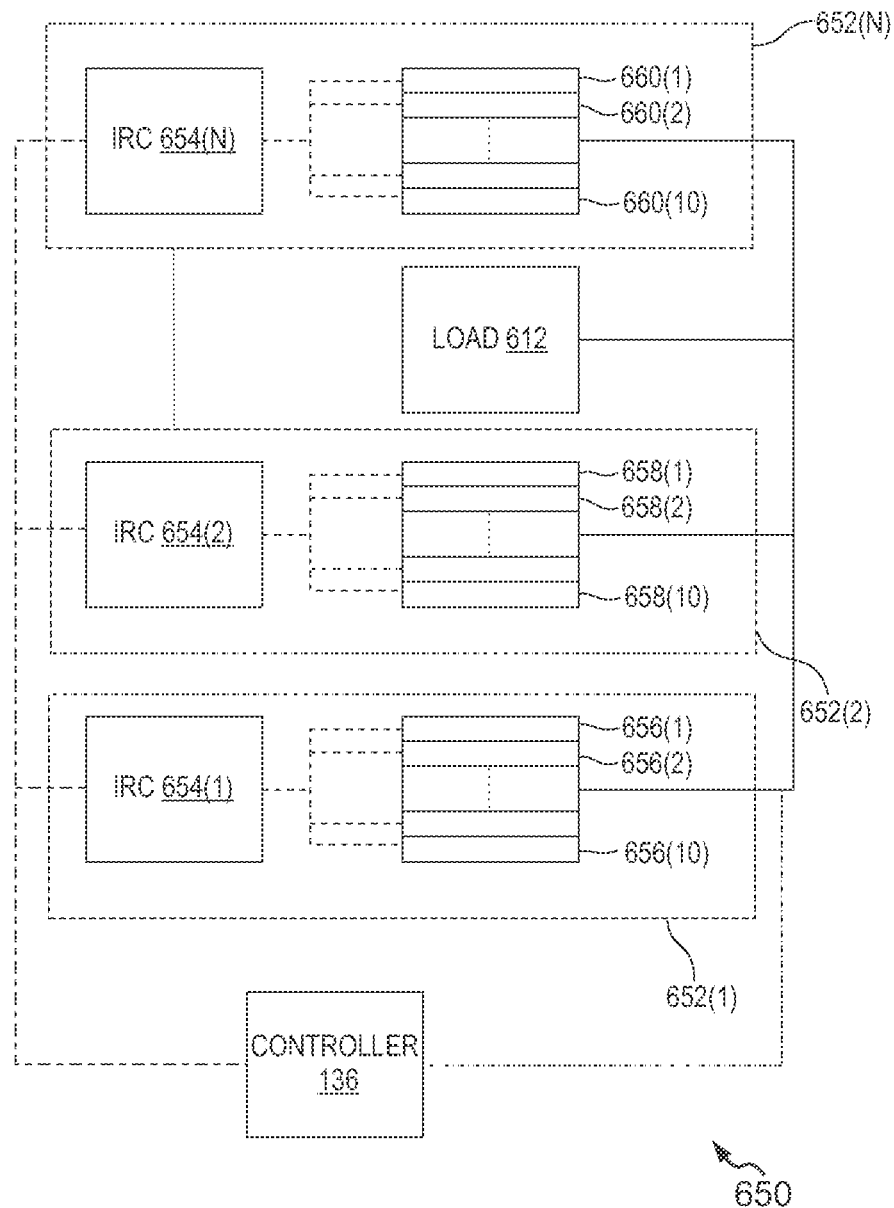
FIG. 6B is a simplified block diagram representing a master-slave control architecture upon implementation of a master-slave technique on the power conversion units in the one or more power stamps, in accordance with an embodiment of the present disclosure.

FIG. 6B is a simplified block diagram representing a master-slave control architecture 650 upon implementation of the master-slave technique on power conversion units 652(1), 652(2), . . . 652(N) in the one or more power stamps (e.g., stamp A), in accordance with an embodiment of the present disclosure. The power conversion unit 652(1) includes an IRC 654(1) controlling an operation of inverters 656(1), 656(2), . . . 656(10). Similarly, the power conversion unit 652(2) includes an IRC 654(2) controlling an operation of inverters 658(1), 658(2), . . . 658(10). Thus, the power conversion unit 652(N) includes an IRC 654(N) controlling an operation of inverters 660(1), 660(2), . . . 660(10). All the power conversion units 652(1), 652(2), . . . 652(N) are transmitting AC power to the load 612 via the AC bus 114.

In an embodiment, the controller 136 receives feedback from the load 612 and generates and transmits the analog current reference values to the IRCs 654(1), 654(2), . . . 654(N). The IRCs 654(1), 654(2), . . . 654(N) further transmits the analog current reference values to the inverters 656(1), 656(2), . . . 656(10), 658(1), 658(2), . . . 658(10), and 660(1), 660(2), . . . 660(10) individually and respectively, thereby regulating their output.

Figure 7:
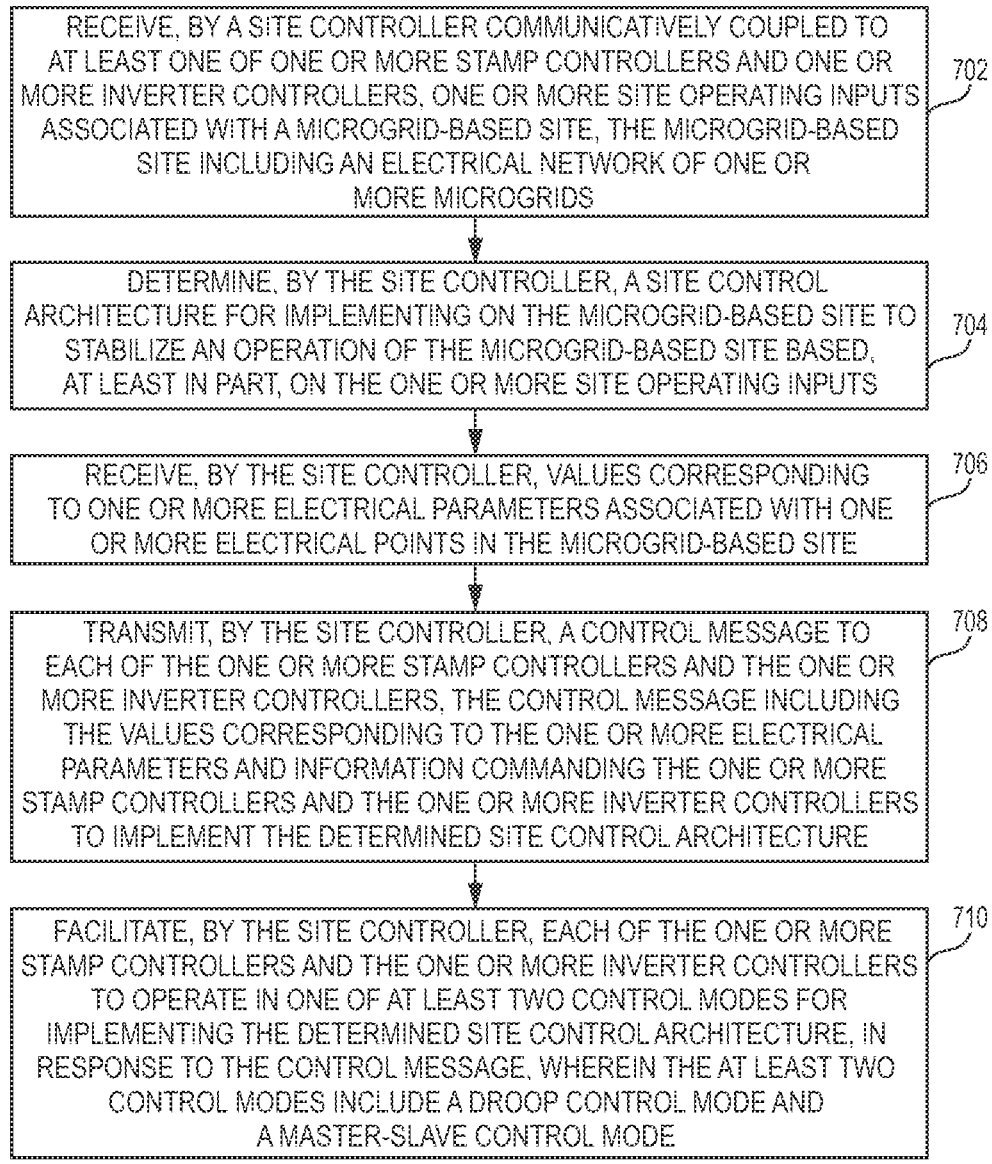
FIG. 7 is a flowchart illustrating a method for determining a site control architecture for controlling one or more inverters in a microgrid-based site, in accordance with an embodiment of the present disclosure.

FIG. 7 is a flowchart illustrating a method 700 for determining a site control architecture for controlling one or more inverters in a microgrid-based site, in accordance with an embodiment of the present disclosure. The method 700 depicted in the flow diagram may be executed by, for example, the site controller 142. Operations of the flow diagram of the method 700, and combinations of operations in the flow diagram of the method 700, may be implemented by, for example, hardware, firmware, a processor, circuitry, and/or a different device associated with the execution of software that includes one or more computer program instructions. The method 700 starts at operation 702.

At 702, the method 700 includes receiving, by a site controller (e.g., site controller 142) communicatively coupled to at least one of one or more stamp controllers (e.g., stamp controllers 136, 138, and 140) and one or more inverter controllers, one or more site operating inputs associated with a microgrid-based site (e.g., site 200), the microgrid-based site 200 including an electrical network of one or more microgrids.

At 704, the method 700 includes determining, by the site controller 142, a site control architecture for implementing on the microgrid-based site 200 to stabilize an operation of the microgrid-based site 200 based, at least in part, on the one or more site operating inputs.

At 706, the method 700 includes receiving, by the site controller 142, values corresponding to one or more electrical parameters associated with one or more electrical points in the microgrid-based site 200.

At 708, the method 700 includes transmitting, by the site controller 142, a control message to each of the one or more stamp controllers 136, 138, and 140 and the one or more inverter controllers, the control message including the values corresponding to the one or more electrical parameters and information commanding the one or more stamp controllers 136, 138, and 140 and the one or more inverter controllers to implement the determined site control architecture.

At 710, the method 700 includes facilitating, by the site controller 142, each of the one or more stamp controllers 136, 138, and 140 and the one or more inverter controllers to operate in one of at least two control modes for implementing the determined site control architecture, in response to the control message, wherein the at least two control modes include an Alternating Current (AC) droop control mode and a master-slave control mode.

Further, in an example, the method 700 may further include receiving, by the one or more stamp controllers 136, 138, and 140, the control message from the site controller 142. The method 700 may also include operating, by the one or more stamp controllers 136, 138, and 140, in a first control mode of the at least two control modes for implementing the determined site control architecture, in response to the control message. Further, the method 700 may include calculating, by the one or more stamp controllers 136, 138, and 140, a group of set points corresponding to one or more power supply parameters to be regulated at one or more inverters connected to the microgrid-based site 200, based at least on, the values, the first control mode in which the one or more stamp controllers 136, 138, and 140 operate, and a second control mode of the at least two control modes in which the one or more inverter controllers operate. Furthermore, the method 700 may include transmitting, by the one or more stamp controllers 136, 138, and 140, the group of set points to the one or more inverter controllers, for regulating the one or more power supply parameters associated with the one or more inverters to stabilize the operation of the microgrid-based site 200.

In another example, the method 700 may include receiving, by the one or more inverter controllers, the control message from the site controller 142, and the first group of set points from the one or more stamp controllers 136, 138, and 140. The method 700 may further include operating, by the one or more inverter controllers, in the second control mode of the at least two control modes for implementing the determined site control architecture, in response to the control message. Furthermore, the method 700 may include regulating, by the one or more inverter controllers, the one or more power supply parameters at an output of the one or more inverters connected to the microgrid-based site 200 to stabilize the operation of the microgrid-based site 200, based at least on, the group of set points and the second control mode in which the one or more inverter controllers operate.

The disclosed method 700 with reference to FIG. 7, or one or more operations of the method 700 may be implemented using software including computer-executable instructions stored on one or more computer-readable media (e.g., non-transitory computer-readable media, such as one or more optical media discs, volatile memory components (e.g., DRAM or SRAM)), or nonvolatile memory or storage components (e.g., hard drives or solid-state nonvolatile memory components, such as Flash memory components) and executed on a computer (e.g., any suitable computer, such as a laptop computer, netbook, Web book, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, satellite, and infrared communications), electronic communications, or other such communication means.

Although the invention has been described with reference to specific exemplary embodiments, it is noted that various modifications and changes may be made to these embodiments without departing from the broad scope of the invention. For example, the various operations, blocks, etc., described herein may be enabled and operated using hardware circuitry (for example, Complementary Metal Oxide Semiconductor (CMOS) based logic circuitry), firmware, software, and/or any combination of hardware, firmware, and/or software (for example, embodied in a machine-readable medium). For example, the apparatuses and methods may be embodied using transistors, logic gates, and electrical circuits (for example, Application-Specific Integrated Circuit (ASIC) circuitry and/or in Digital Signal Processor (DSP) circuitry).

Various embodiments of the invention may include one or more computer programs stored or otherwise embodied on a computer-readable medium, wherein the computer programs are configured to cause a processor or the computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media includes any type of tangible storage media. Examples of non-transitory computer-readable media include magnetic storage media (such as floppy disks, magnetic tapes, hard disk drives, etc.), optical magnetic storage media (e.g. magneto-optical disks), Compact Disc Read-Only Memory (CD-ROM), Compact Disc Recordable CD-R, Compact Disc Rewritable CD-R/W), Digital Versatile Disc (DVD), BLU-RAY® Disc (BD), and semiconductor memories (such as mask ROM, programmable ROM (PROM), Erasable PROM (EPROM), flash memory, Random Access Memory (RAM), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations that are different from those which, are disclosed. Therefore, although the invention has been described based on these exemplary embodiments, it is noted that certain modifications, variations, and alternative constructions may be apparent and well within the scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:
1. A system, comprising:
 a site controller;
 one or more stamp controllers communicatively coupled to the site controller; and
 one or more inverter controllers communicatively coupled to at least one of the site controller and the one or more stamp controllers,
 wherein the site controller is configured to:
  receive one or more site operating inputs associated with a microgrid-based site, the microgrid-based site comprising an electrical network of one or more microgrids;
  determine a site control architecture for implementation on the microgrid-based site to stabilize an operation of the microgrid-based site based, at least in part, on the one or more site operating inputs;
  receive values corresponding to one or more electrical parameters associated with one or more electrical points in the microgrid-based site;
  transmit a control message to each of the one or more stamp controllers and the one or more inverter controllers, the control message comprising the values corresponding to the one or more electrical parameters and information commanding the one or more stamp controllers and the one or more inverter controllers to implement the determined site control architecture; and select one of at least two control modes for each of the one or more stamp controllers and the one or more inverter controllers for implementing the determined site control architecture, in response to the control message, wherein the at least two control modes comprise an Alternating Current (AC) droop control mode and a master-slave control mode, wherein in the AC droop control mode, one stamp controller or one inverter controller senses an output voltage of a corresponding stamp or inverter and controls the output voltage independently based on AC droop curves, and wherein in the Master control mode, one stamp controller or one inverter controller regulates a common bus voltage and sends current reference signals to other stamp controllers or other inverter controllers.

2. The system as claimed in claim 1, wherein the site control architecture comprises one of a complete droop control architecture, a complete master-slave control architecture, a stamp level droop control architecture, and a site level master-slave control architecture.

3. The system as claimed in claim 1, wherein each stamp controller of the one or more stamp controllers is configured to:
receive the control message from the site controller;
operate in a first control mode of the at least two control modes for implementing the determined site control architecture, in response to the control message;
calculate a group of set points corresponding to one or more power supply parameters to be regulated at one or more inverters connected to the microgrid-based site, based at least on, the values, the first control mode in which the one or more stamp controllers operate, and a second control mode of the at least two control modes in which the one or more inverter controllers operate; and
transmit the group of set points to the one or more inverter controllers, for regulating the one or more power supply parameters associated with the one or more inverters to stabilize the operation of the microgrid-based site.

4. The system as claimed in claim 3, wherein the first control mode comprises one of the AC droop control mode and the master-slave control mode, wherein the second control mode comprises one of the AC droop control mode and the master-slave control mode.

5. The system as claimed in claim 3, wherein the group of set points comprise droop parameters when the determined site control architecture implemented on the microgrid-based site comprises a complete droop control architecture.

6. The system as claimed in claim 3, wherein the group of set points comprise analog current reference values when the determined site control architecture implemented on the microgrid-based site comprises one of a complete master-slave control architecture, a stamp level droop control architecture, and a site level droop control architecture.

7. The system as claimed in claim 3, wherein the one or more inverter controllers are configured to:
receive the control message from the site controller, and the first group of set points from the one or more stamp controllers;

operate in the second control mode of the at least two control modes for implementing the determined site control architecture, in response to the control message; and regulate the one or more power supply parameters at an output of the one or more inverters connected to the microgrid-based site to stabilize the operation of the microgrid-based site, based at least on, the group of set points and the second control mode in which the one or more inverter controllers operate.

8. A method, comprising:
receiving, by a site controller communicatively coupled to at least one of one or more stamp controllers and one or more inverter controllers, one or more site operating inputs associated with a microgrid-based site, the microgrid-based site comprising an electrical network of one or more microgrids;
determining, by the site controller, a site control architecture for implementing on the microgrid-based site to stabilize an operation of the microgrid-based site based, at least in part, on the one or more site operating inputs;
receiving, by the site controller, values corresponding to one or more electrical parameters associated with one or more electrical points in the microgrid-based site;
transmitting, by the site controller, a control message to each of the one or more stamp controllers and the one or more inverter controllers, the control message comprising the values corresponding to the one or more electrical parameters and information commanding the one or more stamp controllers and the one or more inverter controllers to implement the determined site control architecture; and
selecting, by the site controller, one of at least two control modes for each of the one or more stamp controllers and the one or more inverter controllers for implementing the determined site control architecture, in response to the control message, wherein the at least two control modes comprise an Alternating Current (AC) droop control mode and a master-slave control mode, wherein in the AC droop control mode, one stamp controller or one inverter controller senses an output voltage of a corresponding stamp or inverter and controls the output voltage independently based on AC droop curves, and wherein in the Master control mode, one stamp controller or one inverter controller regulates a common bus voltage and sends current reference signals to other stamp controllers or other inverter controllers.

9. The method as claimed in claim 8, further comprising:
receiving, by the one or more stamp controllers, the control message from the site controller;
operating, by the one or more stamp controllers, in a first control mode of the at least two control modes for implementing the determined site control architecture, in response to the control message;
calculating, by the one or more stamp controllers, a group of set points corresponding to one or more power supply parameters to be regulated at one or more inverters connected to the microgrid-based site, based at least on, the values, the first control mode in which the one or more stamp controllers operate, and a second control mode of the at least two control modes in which the one or more inverter controllers operate; and
transmitting, by the one or more stamp controllers, the group of set points to the one or more inverter controllers, for regulating the one or more power supply parameters associated with the one or more inverters to stabilize the operation of the microgrid-based site.

10. The method as claimed in claim 8, further comprising:
- receiving, by the one or more inverter controllers, the control message from the site controller, and the first group of set points from the one or more stamp controllers;
- operating, by the one or more inverter controllers, in the second control mode of the at least two control modes for implementing the determined site control architecture, in response to the control message; and
- regulating, by the one or more inverter controllers, the one or more power supply parameters at an output of the one or more inverters connected to the microgrid-based site to stabilize the operation of the microgrid-based site, based at least on, the group of set points and the second control mode in which the one or more inverter controllers operate.

\* \* \* \* \*